(12) United States Patent
Wang et al.

(10) Patent No.: US 11,611,948 B2
(45) Date of Patent: Mar. 21, 2023

(54) PAGING TECHNIQUES FOR BALANCED POWER SAVINGS AND PUBLIC WARNING SYSTEM MONITORING

(71) Applicant: QUALCOMM Incorporated, San Diego, CA (US)

(72) Inventors: Shanshan Wang, San Diego, CA (US); Xipeng Zhu, San Diego, CA (US); Ozcan Ozturk, San Diego, CA (US); Arvind Vardarajan Santhanam, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 31 days.

(21) Appl. No.: 16/862,175

(22) Filed: Apr. 29, 2020

(65) Prior Publication Data

US 2020/0351821 A1     Nov. 5, 2020

Related U.S. Application Data

(60) Provisional application No. 62/847,169, filed on May 13, 2019, provisional application No. 62/842,492, filed on May 2, 2019.

(51) Int. Cl.
    *H04W 68/02*      (2009.01)
    *H04W 52/02*      (2009.01)
    (Continued)

(52) U.S. Cl.
    CPC ............ *H04W 68/02* (2013.01); *H04W 4/06* (2013.01); *H04W 4/90* (2018.02); *H04W 52/0225* (2013.01); *H04W 68/005* (2013.01)

(58) Field of Classification Search
CPC ..... H04W 68/02; H04W 68/005; H04W 4/06; H04W 4/90; H04W 52/0225
See application file for complete search history.

(56) References Cited

U.S. PATENT DOCUMENTS 8,463,301 B2    6/2013    Wang et al.
10,560,919 B2   2/2020    Ryu et al.
(Continued)

OTHER PUBLICATIONS

3GPP: "3rd Generation Partnership Project; Technical Specification Group Radio Access Network; NR; User Equipment (UE) procedures in Idle mode and RRC Inactive state (Release 15)", 3GPP TS 38.304 V15.3.0 (Mar. 2019), pp. 1-29.
(Continued)

*Primary Examiner* — Wayne H Cai
(74) *Attorney, Agent, or Firm* — Loza & Loza LLP

(57) ABSTRACT

Aspects of the disclosure relate to a UE and a network device for wireless communication. The UE sends an indication to a network device indicating a capability of receiving a PWS signal and/or a delay requirement for receiving the PWS signal. The UE receives, from the network device, a configured DRX cycle value associated with the indication and a paging signal corresponding to the PWS signal associated with the configured DRX cycle value. The network device determines whether the UE is capable of receiving the PWS signal and whether the UE desires to receive the PWS signal within a duration. The network device configures a DRX cycle value based on the determination and sends, to the UE, the configured DRX cycle value and a paging signal corresponding to the PWS signal based on the configured DRX cycle value. Other aspects, features, and embodiments are also claimed and described.

26 Claims, 11 Drawing Sheets

(51) Int. Cl.
*H04W 68/00* (2009.01)
*H04W 4/06* (2009.01)
*H04W 4/90* (2018.01)

(56) References Cited

U.S. PATENT DOCUMENTS

| | | | |
|---|---|---|---|
| 11,219,079 B2* | 1/2022 | Lee | H04W 76/18 |
| 2009/0233634 A1 | 9/2009 | Aghili et al. | |
| 2010/0130237 A1 | 5/2010 | Kitazoe et al. | |
| 2012/0064899 A1 | 3/2012 | Musiige | |
| 2017/0272925 A1 | 9/2017 | Rupanagudi Venkata et al. | |
| 2018/0098280 A1 | 4/2018 | Choi et al. | |
| 2018/0324652 A1* | 11/2018 | Ryu | H04W 8/04 |
| 2018/0338281 A1 | 11/2018 | Bangolae et al. | |
| 2019/0110179 A1 | 4/2019 | Lee et al. | |
| 2019/0387570 A1* | 12/2019 | Byun | H04W 76/27 |
| 2020/0229133 A1* | 7/2020 | Yi | H04W 74/006 |
| 2020/0260264 A1* | 8/2020 | Hapsari | H04W 8/22 |
| 2021/0212153 A1* | 7/2021 | Siomina | H04W 76/28 |
| 2021/0235252 A1* | 7/2021 | Shikari | H04W 4/90 |

OTHER PUBLICATIONS

"3rd Generation Partnership Project, Technical Specification Group Services and System Aspects, Public Warning System (PWS) Requirements (Release 16)", 3GPP Standard, Technical Specification, 3GPP TS 22.268, 3rd Generation Partnership Project (3GPP), Mobile Competence Centre, 650, Route Des Lucioles, F-06921 Sophia-Antipolis Cedex, France, vol. RAN WG1, No. V16.2.0, Sep. 21, 2018 (Sep. 21, 2018), pp. 1-21, XP051487088, [retrieved on Sep. 21, 2018] Section 4.2 and 6.2.

International Search Report and Written Opinion—PCT/US2020/030713—ISA/EPO—dated Aug. 13, 2020.

Samsung: "Extending Idle Mode DRX Cycle by Using NAS Procedures", 3GPP Draft, S2-124264, Uepcop Solution R2, 3rd Generation Partnership Project (3GPP), Mobile Competence Centre, 650, Route Des Lucioles, F-06921 Sophia-Antipolis Cedex, France, vol. RAN WG1, No. New Orleans, USA, Nov. 12, 2012-Nov. 16, 2012, Nov. 6, 2012, (Nov. 6, 2012), XP050683934, 4 pages, Retrieved from the Internet: URL: http://www.3gpp.org/ftp/tsg_sa/WG2_Arch/TSGS2_94_New_Orleans/Docs/. [retrieved-on Nov. 6, 2012], Section 7.1.3.1.1 General, figure 7.1.3.X.1.

* cited by examiner

| Bits 4 to 1 of octet 3 | | | | DRX Cycle Value |
|---|---|---|---|---|
| 4 | 3 | 2 | 1 | |
| 0 | 0 | 0 | 0 | DRX cycle value not specified |
| 0 | 0 | 0 | 1 | DRX cycle parameter T = 32 (0.32 sec) |
| 0 | 0 | 1 | 0 | DRX cycle parameter T = 64 (0.64 sec) |
| 0 | 0 | 1 | 1 | DRX cycle parameter T = 128 (1.28 sec) |
| 0 | 1 | 1 | 0 | DRX cycle parameter T = 256 (2.56 sec) |
| 1 | 0 | 0 | 0 | DRX cycle parameter T = 512 (5.12 sec) |
| 1 | 0 | 0 | 1 | DRX cycle parameter T = 1024 (10.24 sec) |

PAGING TECHNIQUES FOR BALANCED POWER SAVINGS AND PUBLIC WARNING SYSTEM MONITORING

CROSS-REFERENCE TO RELATED APPLICATIONS

This application claims priority to and the benefit of U.S. Provisional Application Ser. No. 62/842,492 entitled "WIRELESS COMMUNICATION TECHNIQUES UTILIZING PAGING CYCLE EXTENSION FEATURES" filed on May 2, 2019, and U.S. Provisional Application Ser. No. 62/847,169 entitled "PAGING TECHNIQUES FOR BALANCED POWER SAVINGS AND PUBLIC WARNING SYSTEM MONITORING" filed on May 13, 2019, the entire contents of said applications are incorporated herein by reference as if fully set forth below in their entireties and for all applicable purposes.

TECHNICAL FIELD

The technology discussed below relates generally to wireless communication systems, and more particularly, to paging techniques. Embodiments can provide and enable techniques for extending a paging cycle for communication device power savings and paging techniques for balancing power savings and public warning system (PWS) signal monitoring.

INTRODUCTION

An ability of a user equipment (UE) to monitor paging (i.e., page monitoring or paging monitoring) facilitates the performance of various operations at the UE. For example, page monitoring allows the UE to learn of updates to system information (e.g., neighbor configuration, cell configuration, etc.), receive calls (e.g., mobile terminated calls), and receive public warning system (PWS) signals (e.g., tsunami, earthquake, and/or Amber alerts). Notably, PWS signals may be life-critical, and therefore, the UE may prefer to receive such signals as soon as possible.

According to a current 3GPP specification (3GPP TS 38.304 v15.3.0), the UE monitors paging every discontinuous reception cycle (DRX cycle). However, depending on the periodicity of the DRX cycle used, the UE may wake up too often (e.g., with a short periodicity) to monitor paging. This may result in the UE unnecessarily utilizing a large amount of power, but may also increase the chance of the UE receiving life-critical PWS signals. Alternatively, the UE may wake up less often (e.g., with a long periodicity) to monitor paging based on the DRX cycle used. This may result in the UE utilizing less power, but may also cause the UE to miss paging signals including life-critical PWS signals, which is not desired.

BRIEF SUMMARY OF SOME EXAMPLES

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

Aspects of the disclosure relate to a user equipment (UE) and network device for wireless communication. The UE sends an indication to a network device indicating at least one of a capability of receiving a public warning system (PWS) signal or a delay requirement for receiving the PWS signal. The UE receives, from the network device, a configured discontinuous reception (DRX) cycle value associated with the indication, and further receives, from the network device, a paging signal corresponding to the PWS signal associated with the configured DRX cycle value. The network device determines whether the UE is capable of receiving the PWS signal and whether the UE desires to receive the PWS signal within a duration. The network device configures a DRX cycle value based on the determination and sends the configured DRX cycle value to the UE and a radio access network (RAN). The network device further sends, to the UE, a paging signal corresponding to the PWS signal associated with the configured DRX cycle value. Disclosed aspects include a variety of method, system, device, and apparatus embodiments.

In one example, a method of wireless communication at a user equipment (UE) is disclosed. The method includes sending an indication to a network device indicating at least one of a capability of receiving a public warning system (PWS) signal or a delay requirement specifying whether the UE desires to receive the PWS signal within a duration, receiving, from the network device, a configured discontinuous reception (DRX) cycle value associated with the indication, receiving, from the network device, a paging signal corresponding to the PWS signal associated with the configured DRX cycle value, and receiving the PWS signal from the network device. If the paging signal includes a sequence number or index of the PWS signal corresponding to the paging signal, the method may further include determining whether to receive the PWS signal based on the sequence number or index included in the paging signal, waking to receive the PWS signal if the PWS signal is determined to be received based on the sequence number or index, and refraining from waking to receive the PWS signal if the PWS signal is determined not to be received based on the sequence number or index.

In another example, a user equipment (UE) for wireless communication is disclosed. The UE includes at least one processor, a transceiver communicatively coupled to the at least one processor, and a memory communicatively coupled to the at least one processor. The at least one processor and the memory are configured to send an indication to a network device indicating at least one of a capability of receiving a public warning system (PWS) signal or a delay requirement specifying whether the UE desires to receive the PWS signal within a duration, receive, from the network device, a configured discontinuous reception (DRX) cycle value associated with the indication, receive, from the network device, a paging signal corresponding to the PWS signal associated with the configured DRX cycle value, and receive the PWS signal from the network device. If the paging signal includes a sequence number or index of the PWS signal corresponding to the paging signal, the at least one processor and the memory may further be configured to determine whether to receive the PWS signal based on the sequence number or index included in the paging signal, wake to receive the PWS signal if the PWS signal is determined to be received based on the sequence number or index, and refrain from waking to receive the PWS signal if the PWS signal is determined not to be received based on the sequence number or index.

Various method, system, device, and apparatus embodiments may also include additional features. For example, the UE may determine the at least one of the capability of receiving the PWS signal or the delay requirement based on at least one of a region in which the UE is located or knowledge of the UE on whether an event prompting transmission of the PWS signal will occur. In another example, the indication requests the configured DRX cycle value from the network device, and the indication is sent via a non-access stratum (NAS) registration procedure or a capability update procedure.

In some examples, the UE may receive the paging signal by determining that the UE is located in a region at risk of having occur an event prompting transmission of the PWS signal, updating the configured DRX cycle value with a historic configured DRX cycle value associated with the region, and receiving the paging signal from the network device based on the updated DRX cycle value. In another example, the UE may receive the paging signal by determining that the UE is located in a region at risk of having occur an event prompting transmission of the PWS signal, and receiving the paging signal based on a minimum one of the configured DRX cycle value, a default DRX cycle value, and a radio access network (RAN) configured DRX cycle value when the UE is capable of receiving the PWS signal and the delay requirement specifies that the UE desires to receive the PWS signal within a duration.

In some examples, if the UE is not capable of receiving the PWS signal or the delay requirement specifies that the UE does not desire to receive the PWS signal within a duration, then reception of the configured DRX cycle value indicates that the UE is not allowed to receive the paging signal based on a minimum one of the configured DRX cycle value, a default DRX cycle value, and a radio access network (RAN) configured DRX cycle value, and is to receive the paging signal based on the configured DRX cycle value. In another example, the UE may receive the paging signal by deriving a paging repetition pattern over a duration of N configured DRX cycle values, where N is an integer greater than or equal to 1, selectively waking to receive the paging signal based on the derived paging repetition pattern, and storing the derived paging repetition pattern in a database.

In some examples, the paging signal includes a sequence number or index of the PWS signal corresponding to the paging signal. As such, the UE may further be configured to determine whether to receive the PWS signal based on the sequence number or index included in the paging signal, wake to receive the PWS signal if the PWS signal is determined to be received based on the sequence number or index, and refrain from waking to receive the PWS signal if the PWS signal is determined not to be received based on the sequence number or index.

In one example, a method for wireless communication at a network device is disclosed. The method includes determining whether a user equipment (UE) is capable of receiving a public warning system (PWS) signal and whether the UE desires to receive the PWS signal within a duration, configuring a discontinuous reception (DRX) cycle value based on the determination, sending the configured DRX cycle value to the UE and a radio access network (RAN), sending, to the UE, a paging signal corresponding to the PWS signal based on the configured DRX cycle value, and sending the PWS signal to the UE.

In another example, a network device for wireless communication is disclosed. The network device includes at least one processor, a transceiver communicatively coupled to the at least one processor, and a memory communicatively coupled to the at least one processor. The at least one processor and the memory are configured to determine whether a user equipment (UE) is capable of receiving a public warning system (PWS) signal and whether the UE desires to receive the PWS signal within a duration, configure a discontinuous reception (DRX) cycle value based on the determination, send the configured DRX cycle value to the UE and a radio access network (RAN), send, to the UE, a paging signal corresponding to the PWS signal based on the configured DRX cycle value, and send the PWS signal to the UE.

Various method, system, device, and apparatus embodiments may also include additional features. For example, if the UE is capable of receiving the PWS signal and desires to receive the PWS signal within a duration, then the configured DRX cycle value is a first DRX cycle value and the sending of the configured DRX cycle value indicates to the UE that the UE is allowed to receive the paging signal based on a minimum one of the first DRX cycle value, a default DRX cycle value, and a RAN configured DRX cycle value. In another example, if the UE is not capable of receiving the PWS signal or does not desire to receive the PWS signal within a duration, then the configured DRX cycle value is a second DRX cycle value and the sending of the configured DRX cycle value indicates to the UE that the UE is not allowed to receive the paging signal based on a minimum one of the second DRX cycle value, the default DRX cycle value, and the RAN configured DRX cycle value, and is to receive the paging signal based on the second DRX cycle value.

In some examples, the network device may determine whether the UE is capable of receiving the PWS signal by receiving an indication of PWS-capability or non-PWS-capability from the UE. In another example, the network device may determine whether the UE desires to receive the PWS signal within a duration by receiving a delay requirement via the received indication. In a further example, the indication requests the configured DRX cycle value from the network device, and the indication is received via a non-access stratum (NAS) registration procedure or a capability update procedure.

In some examples, the network device may determine whether the UE is capable of receiving the PWS signal by determining that the UE monitors paging according to an established paging duration, and may send the paging signal by sending the paging signal to the UE for a paging duration at least as long as the established paging duration. In another example, the paging signal includes a sequence number or index of the PWS signal corresponding to the paging signal.

These and other aspects of the invention will become more fully understood upon a review of the detailed description, which follows. Other aspects, features, and embodiments will become apparent to those of ordinary skill in the art, upon reviewing the following description of specific, exemplary embodiments in conjunction with the accompanying figures. While features may be discussed relative to certain embodiments and figures below, all embodiments can include one or more of the advantageous features discussed herein. In other words, while one or more embodiments may be discussed as having certain advantageous features, one or more of such features may also be used in accordance with the various embodiments discussed herein. In similar fashion, while exemplary embodiments may be discussed below as device, system, or method embodiments

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

Aspects of the present disclosure provide and enable techniques for extending a paging cycle for communication device power savings. Other aspects also provide and enable paging techniques for balancing power savings and public warning system (PWS) signal monitoring.

Figure 1:
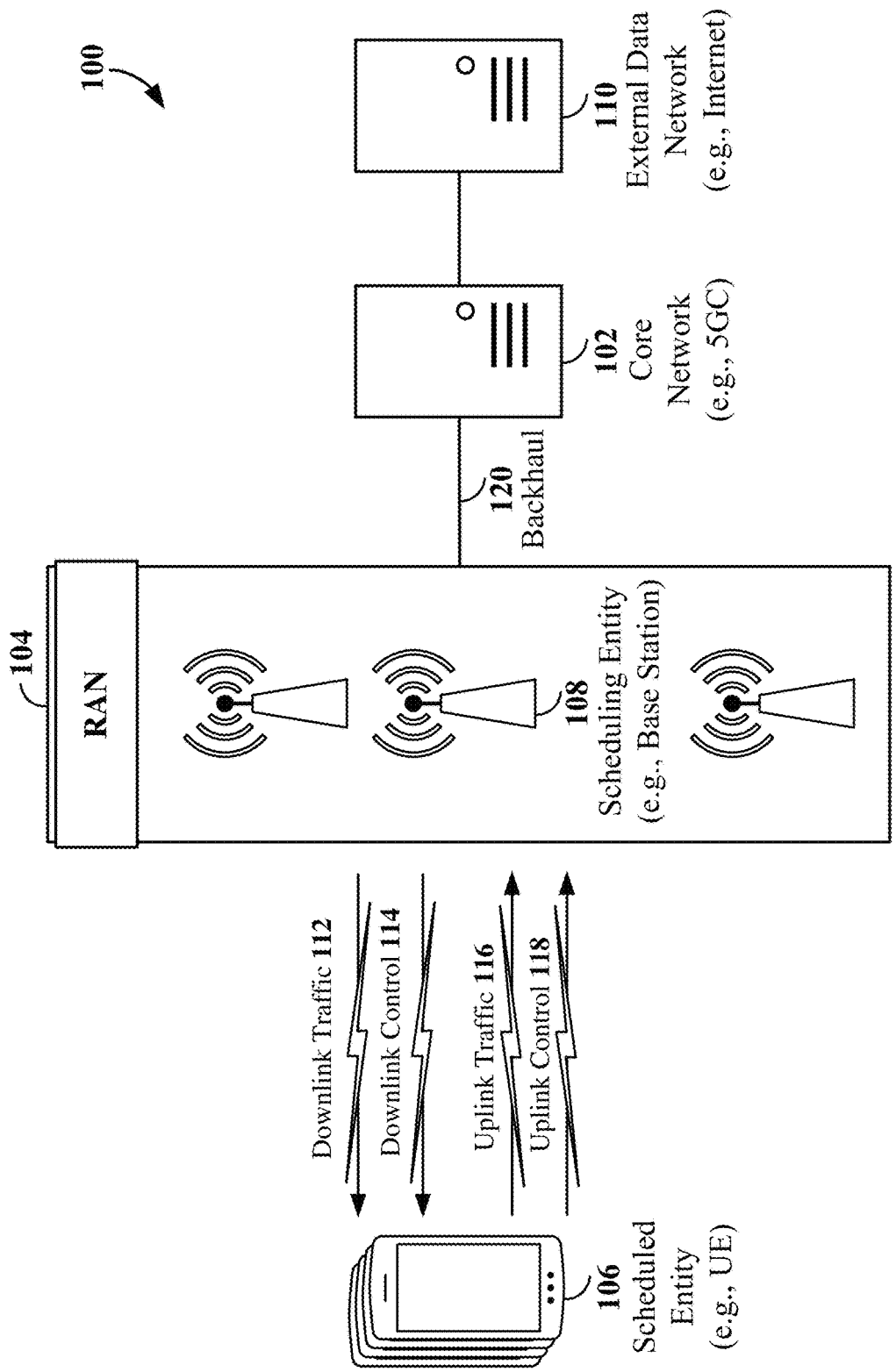
FIG. 1 is a schematic illustration of a wireless communication system according to some aspects.

The various concepts presented throughout this disclosure may be implemented across a broad variety of telecommunication systems, network architectures, and communication standards. Referring now to FIG. 1, as an illustrative example without limitation, various aspects of the present disclosure are illustrated with reference to a wireless communication system 100. The wireless communication system 100 includes three interacting domains: a core network 102, a radio access network (RAN) 104, and a user equipment (UE) 106. By virtue of the wireless communication system 100, the UE 106 may be enabled to carry out data communication with an external data network 110, such as (but not limited to) the Internet.

The RAN 104 may implement any suitable wireless communication technology or technologies to provide radio access to the UE 106. As one example, the RAN 104 may operate according to 3$^{rd}$ Generation Partnership Project (3GPP) New Radio (NR) specifications, often referred to as 5G. As another example, the RAN 104 may operate under a hybrid of 5G NR and Evolved Universal Terrestrial Radio Access Network (eUTRAN) standards, often referred to as LTE. The 3GPP refers to this hybrid RAN as a next-generation RAN, or NG-RAN. Of course, many other examples may be utilized within the scope of the present disclosure.

As illustrated, the RAN 104 includes a plurality of base stations 108. Broadly, a base station is a network element in a radio access network responsible for radio transmission and reception in one or more cells to or from a UE. In different technologies, standards, or contexts, a base station may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), or some other suitable terminology.

The radio access network 104 is further illustrated supporting wireless communication for multiple mobile apparatuses. A mobile apparatus may be referred to as user equipment (UE) in 3GPP standards, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus (e.g., a mobile apparatus) that provides a user with access to network services.

Within the present document, a "mobile" apparatus need not necessarily have a capability to move, and may be stationary. The term mobile apparatus or mobile device broadly refers to a diverse array of devices and technologies. UEs may include a number of hardware structural components sized, shaped, and arranged to help in communication; such components can include antennas, antenna arrays, RF chains, amplifiers, one or more processors, etc. electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT). A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc., an industrial automation and/or enterprise device, a logistics controller, agricultural equipment, etc. Still further, a mobile apparatus may provide for connected medicine or telemedicine support, e.g., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Wireless communication between a RAN 104 and a UE 106 may be described as utilizing an air interface. Transmissions over the air interface from a base station (e.g., base station 108) to one or more UEs (e.g., UE 106) may be referred to as downlink (DL) transmission. In accordance with certain aspects of the present disclosure, the term downlink may refer to a point-to-multipoint transmission originating at a scheduling entity (described further below; e.g., base station 108). Another way to describe this scheme may be to use the term broadcast channel multiplexing. Transmissions from a UE (e.g., UE 106) to a base station (e.g., base station 108) may be referred to as uplink (UL) transmissions. In accordance with further aspects of the present disclosure, the term uplink may refer to a point-to-point transmission originating at a scheduled entity (described further below; e.g., UE 106).

In some examples, access to the air interface may be scheduled, wherein a scheduling entity (e.g., a base station 108) allocates resources for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs 106, which may be scheduled entities, may utilize resources allocated by the scheduling entity 108.

Base stations 108 are not the only entities that may function as scheduling entities. That is, in some examples, a UE may function as a scheduling entity, scheduling resources for one or more scheduled entities (e.g., one or more other UEs).

As illustrated in FIG. 1, a scheduling entity 108 may broadcast downlink traffic 112 to one or more scheduled entities 106. Broadly, the scheduling entity 108 is a node or device responsible for scheduling traffic in a wireless communication network, including the downlink traffic 112 and, in some examples, uplink traffic 116 from one or more scheduled entities 106 to the scheduling entity 108. On the other hand, the scheduled entity 106 is a node or device that receives downlink control information 114, including but not limited to scheduling information (e.g., a grant), synchronization or timing information, or other control information from another entity in the wireless communication network such as the scheduling entity 108.

In general, base stations 108 may include a backhaul interface for communication with a backhaul portion 120 of the wireless communication system. The backhaul 120 may provide a link between a base station 108 and the core network 102. Further, in some examples, a backhaul network may provide interconnection between the respective base stations 108. Various types of backhaul interfaces may be employed, such as a direct physical connection, a virtual network, or the like using any suitable transport network.

The core network 102 may be a part of the wireless communication system 100, and may be independent of the radio access technology used in the RAN 104. In some examples, the core network 102 may be configured according to 5 G standards (e.g., 5GC). In other examples, the core network 102 may be configured according to a 4 G evolved packet core (EPC), or any other suitable standard or configuration.

Figure 2:
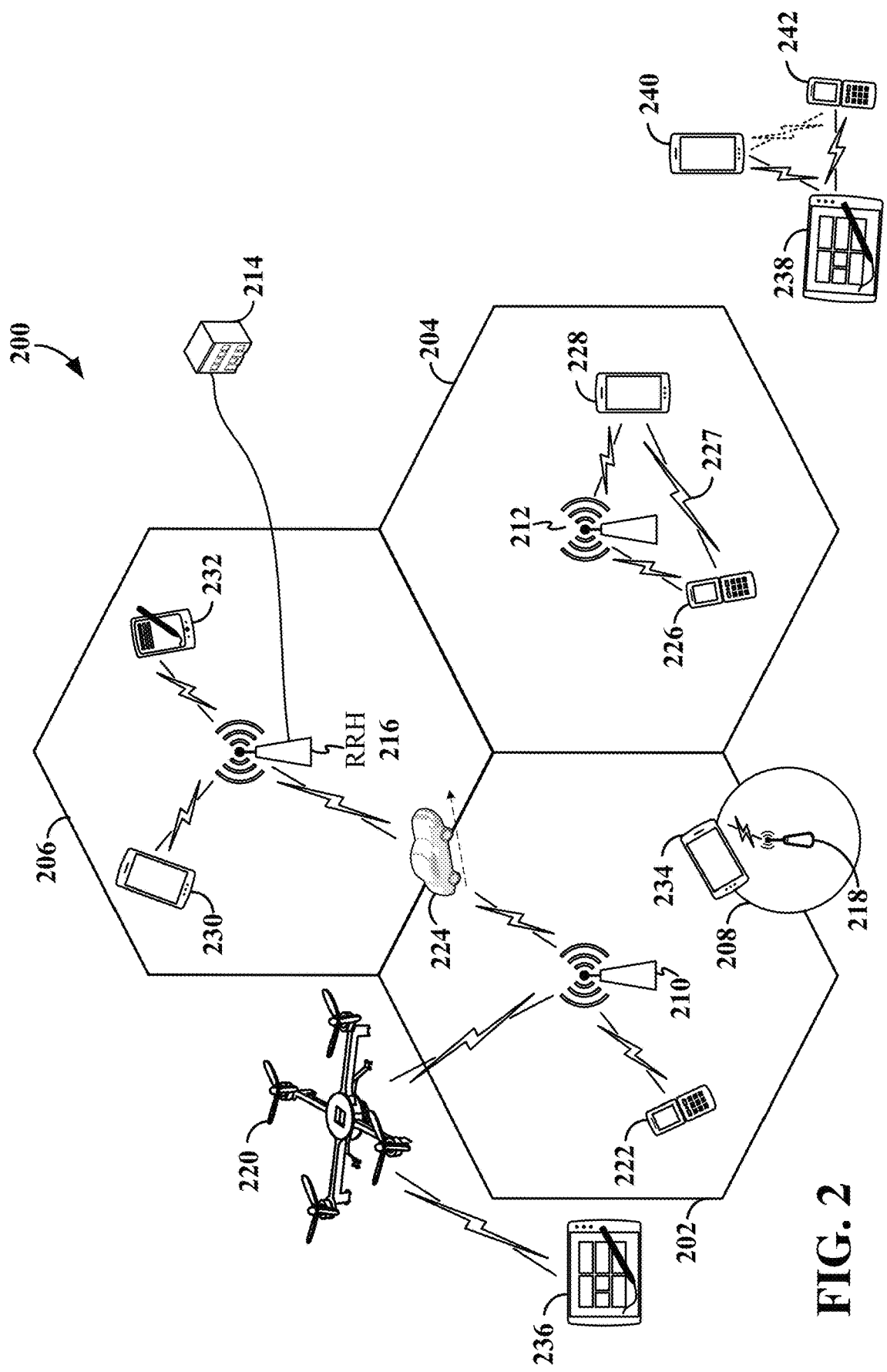
FIG. 2 is a conceptual illustration of an example of a radio access network according to some aspects.

Referring now to FIG. 2, by way of example and without limitation, a schematic illustration of a RAN 200 is provided. In some examples, the RAN 200 may be the same as the RAN 104 described above and illustrated in FIG. 1. The geographic area covered by the RAN 200 may be divided into cellular regions (cells) that can be uniquely identified by a user equipment (UE) based on an identification broadcasted from one access point or base station. FIG. 2 illustrates macrocells 202, 204, and 206, and a small cell 208, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

In FIG. 2, two base stations 210 and 212 are shown in cells 202 and 204; and a third base station 214 is shown controlling a remote radio head (RRH) 216 in cell 206. That is, a base station can have an integrated antenna or can be connected to an antenna or RRH by feeder cables. In the illustrated example, the cells 202, 204, and 126 may be referred to as macrocells, as the base stations 210, 212, and 214 support cells having a large size. Further, a base station 218 is shown in the small cell 208 (e.g., a microcell, picocell, femtocell, home base station, home Node B, home eNode B, etc.) which may overlap with one or more macrocells. In this example, the cell 208 may be referred to as a small cell, as the base station 218 supports a cell having a relatively small size. Cell sizing can be done according to system design as well as component constraints.

It is to be understood that the radio access network 200 may include any number of wireless base stations and cells. Further, a relay node may be deployed to extend the size or coverage area of a given cell. The base stations 210, 212, 214, 218 provide wireless access points to a core network for any number of mobile apparatuses. In some examples, the base stations 210, 212, 214, and/or 218 may be the same as the base station/scheduling entity 108 described above and illustrated in FIG. 1.

FIG. 2 further includes a quadcopter or drone 220, which may be configured to function as a base station. That is, in some examples, a cell may not necessarily be stationary, and the geographic area of the cell may move according to the location of a mobile base station such as the quadcopter 220.

Within the RAN 200, the cells may include UEs that may be in communication with one or more sectors of each cell. Further, each base station 210, 212, 214, 218, and 220 may be configured to provide an access point to a core network 102 (see FIG. 1) for all the UEs in the respective cells. For example, UEs 222 and 224 may be in communication with base station 210; UEs 226 and 228 may be in communication with base station 212; UEs 230 and 232 may be in communication with base station 214 by way of RRH 216; UE 234 may be in communication with base station 218; and UE 236 may be in communication with mobile base station 220. In some examples, the UEs 222, 224, 226, 228, 230, 232, 234, 236, 238, 240, and/or 242 may be the same as the UE/scheduled entity 106 described above and illustrated in FIG. 1.

In some examples, a mobile network node (e.g., quadcopter 220) may be configured to function as a UE. For example, the quadcopter 220 may operate within cell 202 by communicating with base station 210.

In a further aspect of the RAN 200, sidelink signals may be used between UEs without necessarily relying on scheduling or control information from a base station. For example, two or more UEs (e.g., UEs 226 and 228) may communicate with each other using peer to peer (P2P) or sidelink signals 227 without relaying that communication through a base station (e.g., base station 212). In a further example, UE 238 is illustrated communicating with UEs 240 and 242. Here, the UE 238 may function as a scheduling entity or a primary sidelink device, and UEs 240 and 242 may function as a scheduled entity or a non-primary (e.g., secondary) sidelink device. In still another example, a UE may function as a scheduling entity in a device-to-device (D2D), peer-to-peer (P2P), or vehicle-to-vehicle (V2V) network, and/or in a mesh network. In a mesh network example, UEs 240 and 242 may optionally communicate directly with one another in addition to communicating with the scheduling entity 238. Thus, in a wireless communication system with scheduled access to time-frequency resources and having a cellular configuration, a P2P configuration, or a mesh configuration, a scheduling entity and one or more scheduled entities may communicate utilizing the scheduled resources.

In the radio access network 200, the ability for a UE to communicate while moving, independent of its location, is referred to as mobility. The various physical channels between the UE and the radio access network are generally set up, maintained, and released under the control of an access and mobility management function (AMF, not illustrated, part of the core network 102 in FIG. 1). In some scenarios, the AMF may include a security context management function (SCMF). The SCMF can manage in whole or in part, the security context for both the control plane and the user plane functionality, and a security anchor function (SEAF) that performs authentication.

In various aspects of the disclosure, a radio access network 200 may utilize DL-based mobility or UL-based mobility to enable mobility and handovers (i.e., the transfer of a UE's connection from one radio channel to another). In a network configured for DL-based mobility, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 224 (illustrated as a vehicle, although any suitable form of UE may be used) may move from the geographic area corresponding to its serving cell 202 to the geographic area corresponding to a neighbor cell 206. When the signal strength or quality from the neighbor cell 206 exceeds that of its serving cell 202 for a given amount of time, the UE 224 may transmit a reporting message to its serving base station 210 indicating this condition. In response, the UE 224 may receive a handover command, and the UE may undergo a handover to the cell 206.

In a network configured for UL-based mobility, UL reference signals from each UE may be utilized by the network to select a serving cell for each UE. In some examples, the base stations 210, 212, and 214/216 may broadcast unified synchronization signals (e.g., unified Primary Synchronization Signals (PSSs), unified Secondary Synchronization Signals (SSSs) and unified Physical Broadcast Channels (PBCH)). The UEs 222, 224, 226, 228, 230, and 232 may receive the unified synchronization signals, derive the carrier frequency and slot timing from the synchronization signals, and in response to deriving timing, transmit an uplink pilot or reference signal. The uplink pilot signal transmitted by a UE (e.g., UE 224) may be concurrently received by two or more cells (e.g., base stations 210 and 214/216) within the radio access network 200. Each of the cells may measure a strength of the pilot signal, and the radio access network (e.g., one or more of the base stations 210 and 214/216 and/or a central node within the core network) may determine a serving cell for the UE 224. As the UE 224 moves through the radio access network 200, the network may continue to monitor the uplink pilot signal transmitted by the UE 224. When the signal strength or quality of the pilot signal measured by a neighboring cell exceeds that of the signal strength or quality measured by the serving cell, the network 200 may handover the UE 224 from the serving cell to the neighboring cell, with or without informing the UE 224.

Although the synchronization signal transmitted by the base stations 210, 212, and 214/216 may be unified, the synchronization signal may not identify a particular cell, but rather may identify a zone of multiple cells operating on the same frequency and/or with the same timing. The use of zones in 5G networks or other next generation communication networks can enable uplink-based mobility framework and improve efficiency of both the UE and the network. Efficiencies may be brought about because the number of mobility messages that need to be exchanged between the UE and the network may be reduced.

In various implementations, the air interface in the radio access network 200 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

The air interface in the radio access network 200 may utilize one or more duplexing algorithms. Duplex refers to a point-to-point communication link where both endpoints can communicate with one another in both directions. Full duplex means both endpoints can simultaneously communicate with one another. Half duplex means only one endpoint can send information to the other at a time. In a wireless link, a full duplex channel generally relies on physical isolation of a transmitter and receiver, and suitable interference cancellation technologies. Full duplex emulation is frequently implemented for wireless links by utilizing frequency division duplex (FDD) or time division duplex (TDD). In FDD, transmissions in different directions operate at different carrier frequencies. In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot.

Figure 3:
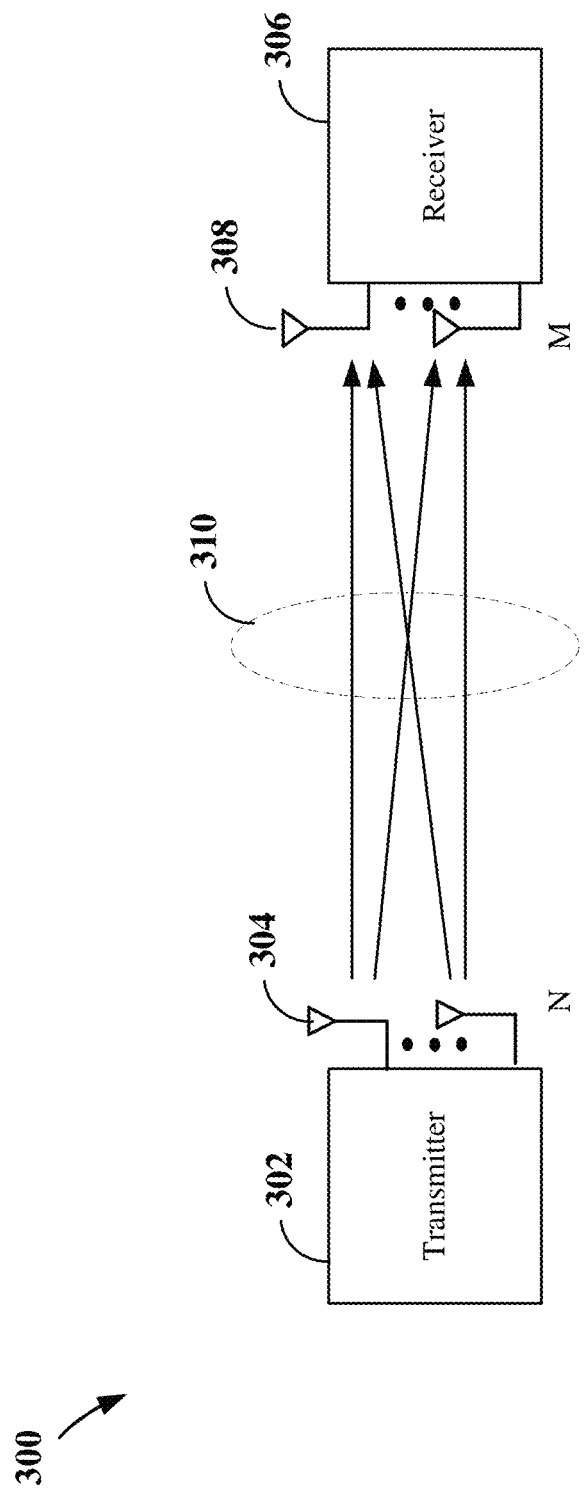
FIG. 3 is a block diagram illustrating a wireless communication system supporting multiple-input multiple-output (MIMO) communication according to some aspects.

In some aspects of the disclosure, the scheduling entity and/or scheduled entity may be configured for beamforming and/or multiple-input multiple-output (MIMO) technology. FIG. 3 illustrates an example of a wireless communication system 300 supporting MIMO. In a MIMO system, a transmitter 302 includes multiple transmit antennas 304 (e.g., N transmit antennas) and a receiver 306 includes multiple receive antennas 308 (e.g., M receive antennas). Thus, there are N×M signal paths 310 from the transmit antennas 304 to the receive antennas 308. Each of the transmitter 302 and the receiver 306 may be implemented, for example, within a scheduling entity 108, a scheduled entity 106, or any other suitable wireless communication device.

The use of such multiple antenna technology enables the wireless communication system to exploit the spatial domain to support spatial multiplexing, beamforming, and transmit diversity. Spatial multiplexing may be used to transmit different streams of data, also referred to as layers, simultaneously on the same time-frequency resource. The data streams may be transmitted to a single UE to increase the data rate or to multiple UEs to increase the overall system capacity, the latter being referred to as multi-user MIMO (MU-MIMO). This is achieved by spatially precoding each data stream (i.e., multiplying the data streams with different weighting and phase shifting) and then transmitting each spatially precoded stream through multiple transmit antennas on the downlink. The spatially precoded data streams arrive at the UE(s) with different spatial signatures, which enables each of the UE(s) to recover the one or more data streams destined for that UE. On the uplink, each UE transmits a spatially precoded data stream, which enables the base station to identify the source of each spatially precoded data stream.

The number of data streams or layers corresponds to the rank of the transmission. In general, the rank of the MIMO system 300 is limited by the number of transmit or receive antennas 304 or 308, whichever is lower. In addition, the channel conditions at the UE, as well as other considerations, such as the available resources at the base station, may also affect the transmission rank. For example, the rank (and therefore, the number of data streams) assigned to a particular UE on the downlink may be determined based on the rank indicator (RI) transmitted from the UE to the base station. The RI may be determined based on the antenna configuration (e.g., the number of transmit and receive antennas) and a measured signal-to-interference-and-noise ratio (SINR) on each of the receive antennas. The RI may indicate, for example, the number of layers that may be supported under the current channel conditions. The base station may use the RI, along with resource information (e.g., the available resources and amount of data to be scheduled for the UE), to assign a transmission rank to the UE.

In Time Division Duplex (TDD) systems, the UL and DL are reciprocal, in that each uses different time slots of the same frequency bandwidth. Therefore, in TDD systems, the base station may assign the rank for DL MIMO transmissions based on UL SINR measurements (e.g., based on a Sounding Reference Signal (SRS) transmitted from the UE or other pilot signal). Based on the assigned rank, the base station may then transmit the CSI-RS with separate C-RS sequences for each layer to provide for multi-layer channel estimation. From the CSI-RS, the UE may measure the channel quality across layers and resource blocks and feed back the CQI and RI values to the base station for use in updating the rank and assigning REs for future downlink transmissions.

In the simplest case, as shown in FIG. 3, a rank-2 spatial multiplexing transmission on a 2×2 MIMO antenna configuration will transmit one data stream from each transmit antenna 304. Each data stream reaches each receive antenna 308 along a different signal path 310. The receiver 306 may then reconstruct the data streams using the received signals from each receive antenna 308.

In order for transmissions over the radio access network 200 to obtain a low block error rate (BLER) while still achieving very high data rates, channel coding may be used. That is, wireless communication may generally utilize a suitable error correcting block code. In a typical block code, an information message or sequence is split up into code blocks (CBs), and an encoder (e.g., a CODEC) at the transmitting device then mathematically adds redundancy to the information message. Exploitation of this redundancy in the encoded information message can improve the reliability of the message, enabling correction for any bit errors that may occur due to the noise.

Data coding may be implemented in multiple manners. In early 5 G NR specifications, user data is coded using quasi-cyclic low-density parity check (LDPC) with two different base graphs: one base graph is used for large code blocks and/or high code rates, while the other base graph is used otherwise. Control information and the physical broadcast channel (PBCH) are coded using Polar coding, based on nested sequences. For these channels, puncturing, shortening, and repetition are used for rate matching.

Aspects of the present disclosure may be implemented utilizing any suitable channel code. Various implementations of scheduling entities 108 and scheduled entities 106 may include suitable hardware and capabilities (e.g., an encoder, a decoder, and/or a CODEC) to utilize one or more of these channel codes for wireless communication.

The air interface in the radio access network 200 may utilize one or more multiplexing and multiple access algorithms to enable simultaneous communication of the various devices. For example, 5G NR specifications provide multiple access for UL transmissions from UEs 222 and 224 to base station 210, and for multiplexing for DL transmissions from base station 210 to one or more UEs 222 and 224, utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier 1-DMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 210 to UEs 222 and 224 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

Various aspects of the present disclosure will be described with reference to an OFDM waveform, schematically illustrated in FIG. 4. It should be understood by those of ordinary skill in the art that the various aspects of the present disclosure may be applied to a DFT-s-OFDMA waveform in substantially the same way as described herein below. That is, while some examples of the present disclosure may focus on an OFDM link for clarity, it should be understood that the same principles may be applied as well to DFT-s-OFDMA waveforms as well as other waveforms.

Within the present disclosure, a frame refers to a duration of 10 ms for wireless transmissions, with each frame consisting of 10 subframes of 1 ms each. On a given carrier, there may be one set of frames in the UL, and another set of frames in the DL. Referring now to FIG. 4, an expanded view of an exemplary DL subframe 402 is illustrated, showing an OFDM resource grid 404. However, as those skilled in the art will readily appreciate, the PHY transmission structure for any particular application may vary from the example described here, depending on any number of factors. Here, time is in the horizontal direction with units of OFDM symbols; and frequency is in the vertical direction with units of subcarriers or tones.

The resource grid 404 may be used to schematically represent time-frequency resources for a given antenna port. That is, in a MIMO implementation with multiple antenna ports available, a corresponding multiple number of resource grids 404 may be available for communication. The resource grid 404 is divided into multiple resource elements (REs) 406. An RE, which is 1 subcarrier×1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 408, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain. Within the present disclosure, it is assumed that a single RB such as the RB 408 entirely corresponds to a single direction of communication (either transmission or reception for a given device).

A UE generally utilizes only a subset of the resource grid 404. An RB may be the smallest unit of resources that can be allocated to a UE. Thus, the more RBs scheduled for a UE, and the higher the modulation scheme chosen for the air interface, the higher the data rate for the UE.

In this illustration, the RB 408 is shown as occupying less than the entire bandwidth of the subframe 402, with some subcarriers illustrated above and below the RB 408. In a given implementation, the subframe 402 may have a bandwidth corresponding to any number of one or more RBs 408. Further, in this illustration, the RB 408 is shown as occupying less than the entire duration of the subframe 402, although this is merely one possible example.

Each subframe 402 (e.g., a 1 ms subframe) may consist of one or multiple adjacent slots. In the example shown in FIG. 4, one subframe 402 includes four slots 410, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots having a shorter duration (e.g., 1, 2, 4, or 7 OFDM symbols). These mini-slots may in some cases be transmitted occupying resources scheduled for ongoing slot transmissions for the same or for different UEs.

An expanded view of one of the slots 410 illustrates the slot 410 including a control region 412 and a data region 414. In general, the control region 412 may carry control channels (e.g., PDCCH), and the data region 414 may carry data channels (e.g., PDSCH or PUSCH). Of course, a slot may contain all DL, all UL, or at least one DL portion and at least one UL portion. The simple structure illustrated in FIG. 4 is merely exemplary in nature, and different slot structures may be utilized, and may include one or more of each of the control region(s) and data region(s).

Figure 4:
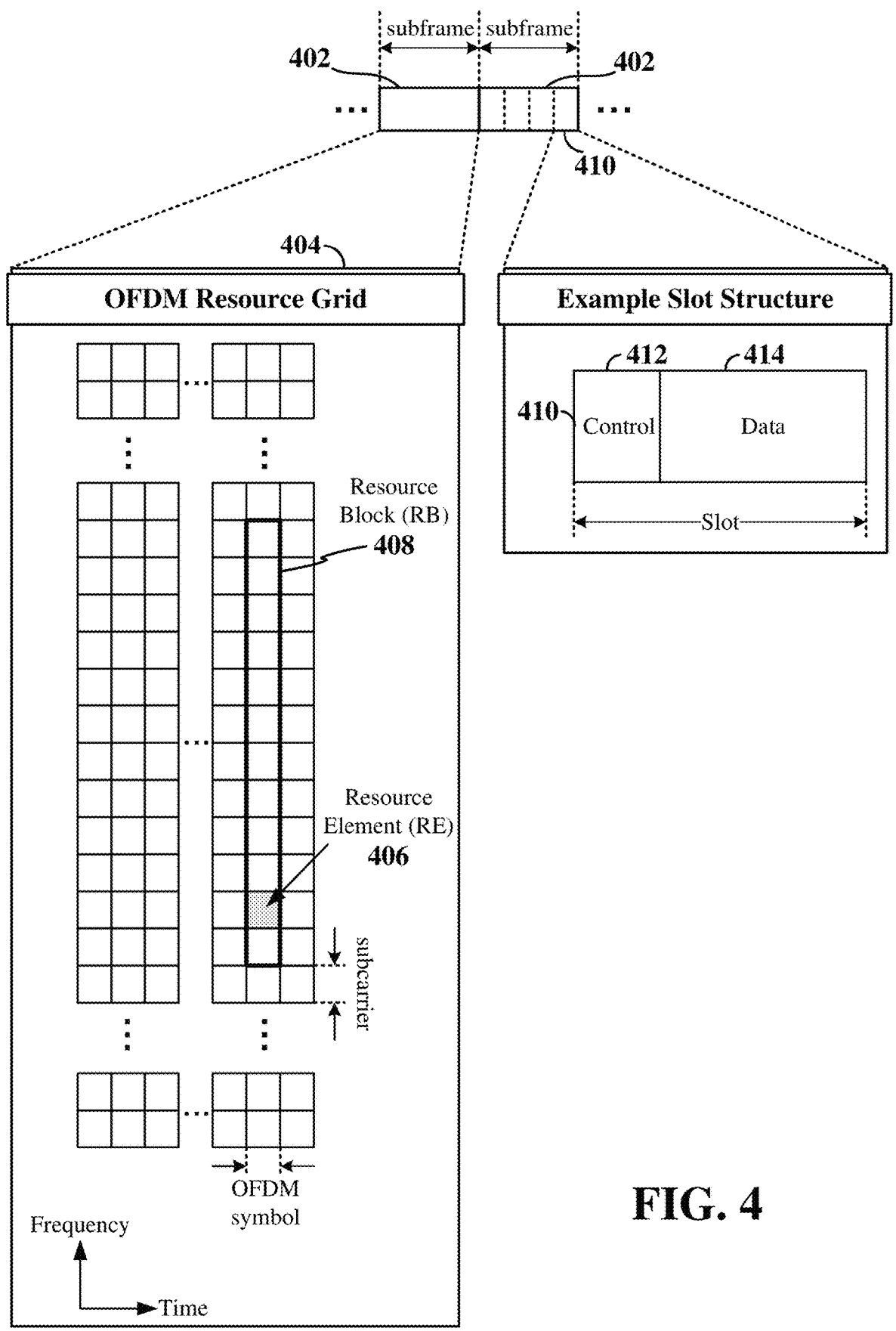
FIG. 4 is a schematic illustration of an organization of wireless resources in an air interface utilizing orthogonal frequency divisional multiplexing (OFDM) according to some aspects.

Although not illustrated in FIG. 4, the various REs 406 within an RB 408 may be scheduled to carry one or more physical channels, including control channels, shared channels, data channels, etc. Other REs 406 within the RB 408 may also carry pilots or reference signals. These pilots or reference signals may provide for a receiving device to perform channel estimation of the corresponding channel, which may enable coherent demodulation/detection of the control and/or data channels within the RB 408.

In a DL transmission, the transmitting device (e.g., the scheduling entity 108) may allocate one or more REs 406 (e.g., within a control region 412) to carry DL control information 114 including one or more DL control channels that generally carry information originating from higher layers, such as a physical broadcast channel (PBCH), a physical downlink control channel (PDCCH), etc., to one or more scheduled entities 106. In addition, DL REs may be allocated to carry DL physical signals that generally do not carry information originating from higher layers. These DL physical signals may include a primary synchronization signal (PSS); a secondary synchronization signal (SSS); demodulation reference signals (DM-RS); phase-tracking reference signals (PT-RS); channel-state information reference signals (CSI-RS); etc.

The synchronization signals PSS and SSS (collectively referred to as SS), and in some examples, the PBCH, may be transmitted in an SS block that includes 4 consecutive OFDM symbols, numbered via a time index in increasing order from 0 to 3. In the frequency domain, the SS block may extend over 240 contiguous subcarriers, with the subcarriers being numbered via a frequency index in increasing order from 0 to 239. Of course, the present disclosure is not limited to this specific SS block configuration. Other non-limiting examples may utilize greater or fewer than two synchronization signals; may include one or more supplemental channels in addition to the PBCH; may omit a PBCH; and/or may utilize nonconsecutive symbols for an SS block, within the scope of the present disclosure.

The PDCCH may carry downlink control information (DCI) for one or more UEs in a cell. This can include, but is not limited to, power control commands, scheduling information, a grant, and/or an assignment of REs for DL and UL transmissions.

In an UL transmission, a transmitting device (e.g., a scheduled entity 106) may utilize one or more REs 406 to carry UL control information 118 (UCI). The UCI can originate from higher layers via one or more UL control channels, such as a physical uplink control channel (PUCCH), a physical random access channel (PRACH), etc., to the scheduling entity 108. Further, UL REs may carry UL physical signals that generally do not carry information originating from higher layers, such as demodulation reference signals (DM-RS), phase-tracking reference signals (PT-RS), sounding reference signals (SRS), etc. In some examples, the control information 118 may include a scheduling request (SR), i.e., a request for the scheduling entity 108 to schedule uplink transmissions. Here, in response to the SR transmitted on the control channel 118, the scheduling entity 108 may transmit downlink control information 114 that may schedule resources for uplink packet transmissions.

UL control information may also include hybrid automatic repeat request (HARQ) feedback such as an acknowledgment (ACK) or negative acknowledgment (NACK), channel state information (CSI), or any other suitable UL control information. HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission confirmed, an ACK may be transmitted, whereas if not confirmed, a NACK may be transmitted. In response to a NACK, the transmitting device may send a HARQ retransmission, which may implement chase combining, incremental redundancy, etc.

In addition to control information, one or more REs 406 (e.g., within the data region 414) may be allocated for user data or traffic data. Such traffic may be carried on one or more traffic channels, such as, for a DL transmission, a physical downlink shared channel (PDSCH); or for an UL transmission, a physical uplink shared channel (PUSCH).

In order for a UE to gain initial access to a cell, the RAN may provide system information (SI) characterizing the cell. This system information may be provided utilizing minimum system information (MSI), and other system information (OSI). The MSI may be periodically broadcast over the cell to provide the most basic information required for initial cell access, and for acquiring any OSI that may be broadcast periodically or sent on-demand. In some examples, the MSI may be provided over two different downlink channels. For example, the PBCH may carry a master information block (MIB), and the PDSCH may carry a system information block type 1 (SIB1). In the art, SIB1 may be referred to as the remaining minimum system information (RMSI).

OSI may include any SI that is not broadcast in the MSI. In some examples, the PDSCH may carry a plurality of SIBs, not limited to SIB1, discussed above. Here, the OSI may be provided in these SIBs, e.g., SIB2 and above.

The channels or carriers described above and illustrated in FIGS. 1 and 4 are not necessarily all the channels or carriers that may be utilized between a scheduling entity 108 and scheduled entities 106, and those of ordinary skill in the art will recognize that other channels or carriers may be utilized in addition to those illustrated, such as other traffic, control, and feedback channels.

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

Aspects of the present disclosure enable and provide techniques for extending a paging cycle for communication device power savings. Various types of communication devices, such as user equipment (UE) and network components (e.g., base stations), may utilize various aspects to accomplish the power savings.

In an aspect, a UE-specific DRX cycle may be negotiated by a non-access stratum (NAS) during a registration procedure. The negotiated DRX cycle may be sent to a UE via a NAS registration accept message. The negotiated DRX cycle may be sent to a radio access network (RAN) via next generation (NG) paging for a UE in a RRC_IDLE state and via a UE context setup/modification message for a UE in a RRC_INACTIVE state.

Figure 5:
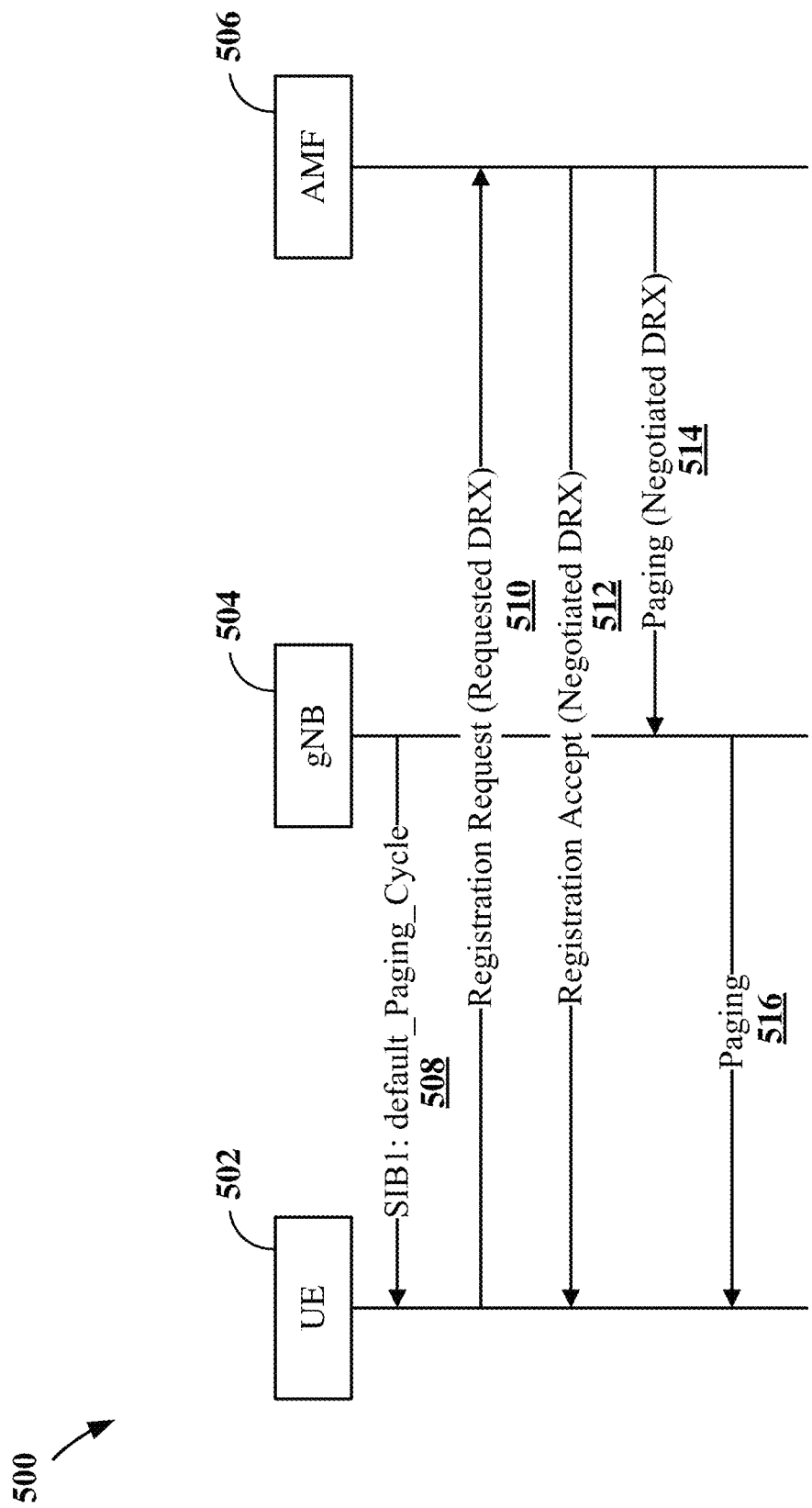
FIG. 5 is a flow diagram illustrating an example UE-specific paging cycle negotiation according to some aspects of the disclosure.

FIG. 5 is a flow diagram 500 illustrating an example UE-specific paging cycle negotiation. At 508, a UE 502 may initially receive, from a gNB 504, a System Information Block Type 1 message (SIB1). The SIB1 may include a default paging cycle (default_Paging_Cycle). Thereafter, at 510, the UE 502 may request a UE-specific DRX cycle by sending a registration request message (including the requested DRX cycle) to an access and mobility management function (AMF) entity 506. At 512, the AMF entity 506 may send a registration accept message (including a negotiated DRX cycle) to the UE 502. At 514, the AMF entity 506 may then inform the gNB 504 of the negotiated DRX cycle via paging. As such, at 516, the gNB 504 may proceed with paging the UE 502 according to the negotiated DRX cycle.

Figure 6:
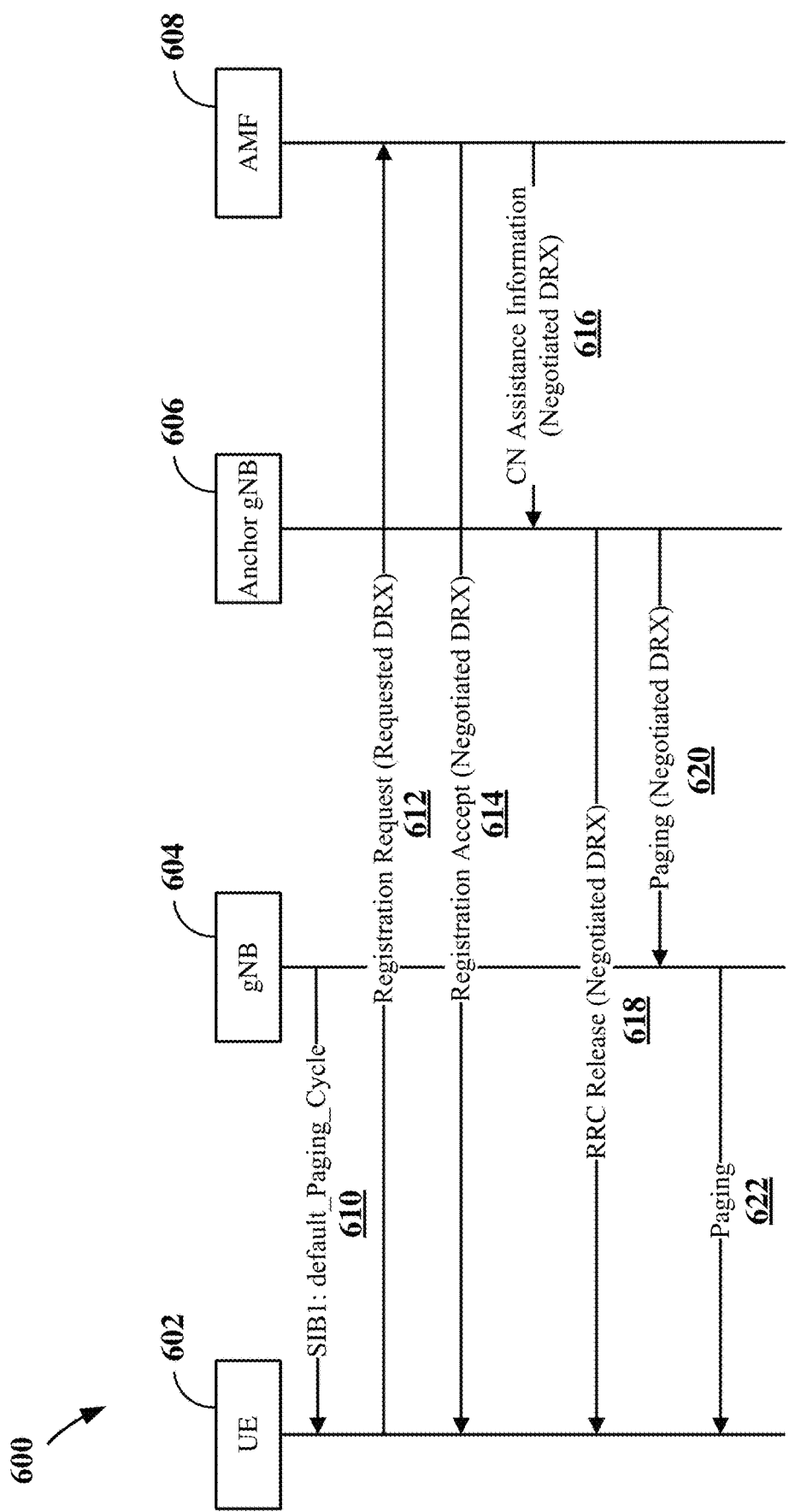
FIG. 6 is a flow diagram illustrating an example UE-specific paging cycle negotiation for a UE in a RRC_INACTIVE state according to some aspects of the disclosure.

FIG. 6 is a flow diagram 600 illustrating an example UE-specific paging cycle negotiation for a UE in a RRC_INACTIVE state. At 610, a UE 602 may initially receive, from a gNB 604, a System Information Block Type 1 message (SIB1). The SIB1 may include a default paging cycle (default_Paging_Cycle). Thereafter, at 612, the UE 602 may request a UE-specific DRX cycle by sending a registration request message (including the requested DRX cycle) to an access and mobility management function (AMF) entity 608. At 614, the AMF entity 608 may send a registration accept message (including a negotiated DRX cycle) to the UE 602. At 616, the AMF entity 608 may then send core network (CN) assistance information (including the negotiated DRX cycle) to an anchor gNB 606. At 618, the anchor gNB 618 may send a RRC release message (including the negotiated DRX cycle) to the UE 602. At 620, the anchor gNB 606 may then inform the gNB 604 of the negotiated DRX cycle via paging. As such, at 622, the gNB 604 may proceed with paging the UE 602 according to the negotiated DRX cycle.

Figure 7:
FIG. 7 is a table illustrating an example coding of DRX cycle values at a non-access stratum (NAS) according to some aspects of the disclosure.

FIG. 7 is a table 700 illustrating an example coding of DRX cycle values at a non-access stratum (NAS). As shown, DRX cycle values may be coded using bits 4 to 1 of octet 3 (e.g., bitstream {bit 4, bit 3, bit 2, bit 1}). For example, a bitstream having bit values {0, 0, 0, 0} may represent that a DRX cycle value is not specified. A bitstream having bit values {0, 0, 0, 1} may represent that a DRX cycle parameter T=32, which is equivalent to 0.32 seconds. A bitstream having bit values {0, 0, 1, 0} may represent that a DRX cycle parameter T=64, which is equivalent to 0.64 seconds. A bitstream having bit values {0, 0, 1, 1} may represent that a DRX cycle parameter T=128, which is equivalent to 1.28 seconds. A bitstream having bit values {0, 1, 1, 0} may represent that a DRX cycle parameter T=256, which is equivalent to 2.56 seconds. A bitstream having bit values {1, 0, 0, 0} may represent that a DRX cycle parameter T=512, which is equivalent to 5.12 seconds. A bitstream having bit values {1, 0, 0, 1} may represent that a DRX cycle parameter T=1024, which is equivalent to 10.24 seconds. Bitstreams having bit values for the bits 4 to 1 of octet 3 other than the bit values described above may represent that the DRX cycle value is not specified. Moreover, bits 8 to 5 of octet 3 may be considered as spare bits and coded as zero.

Notably, a DRX cycle value greater than 2.56 seconds may not be supported by a NAS protocol. As such, 5 G NR interfaces such as NG, Xn, and F1 interfaces may also not support a DRX cycle value greater than 2.56 seconds. Accordingly, to extend a paging DRX cycle, an implementation of the NG, Xn, and F1 interfaces may have to be changed. For example, a UE-specific DRX cycle may be changed to extend to 5.12 seconds and/or 10.24 seconds. In another example, a paging cycle in Xn and NG paging messages may be changed to extend to 5.12 seconds and/or 10.24 seconds.

In an aspect, when a UE-specific DRX cycle and a default paging cycle are inconsistent, the UE uses the minimal DRX value of the two. This prevents the UE from power saving according to the longer DRX cycle. However, when a longer UE-specific DRX cycle is specifically configured by an AMF, the UE will use the longer UE-specific DRX cycle for page monitoring.

In an aspect, a DRX cycle parameter T may be determined as follows. The DRX cycle value T of the UE is determined by a shortest of the UE-specific DRX value (if configured by RRC or upper layers to be below 512 (5.12 seconds)) and a default DRX value broadcast in system information. The DRX cycle value T is the UE-specific DRX value, if configured to be 512 (5.12 seconds) or 1024 (10.24 seconds) by RRC or upper layers. If the UE-specific DRX value is not configured by RRC or by upper layers, then the DRX cycle value T is a default value.

In an aspect, when the UE-specific DRX cycle value is configured to be 5.12 seconds or 10.24 seconds in a NAS registration procedure or RRC release, the UE uses the UE-specific DRX cycle value as a paging cycle to monitor paging. Notably, this enhancement does not impact a paging occasion (PO)/paging frame (PF) calculation formula (LTE eDRX style solution is not needed), and therefore, does not have to be changed. In addition to the UE-specific paging triggered by a UE service, a RAN also sends non-UE-specific paging for: 1) public warning system (PWS)/earthquake and tsunami warning system (ETWS), system information block (SIB) change, and (future) MCCH change. The PO/PF is shared by the two types of paging.

In an aspect, when a longer paging cycle is used, a PWS/ETWS receiving delay may increase. Moreover, the AMF may know the UE type and performance requirements for PWS/ETWS. Accordingly, the AMF may take this information into consideration when determining/assigning the UE-specific DRX cycle value. The longer paging cycle may be applicable to both a RRC_IDLE state and a RRC_INACTIVE state of the UE. Thus, an RRC resume message may be extended for the longer DRX cycle value. In a further aspect, a RAN paging cycle (ran-PagingCycle) may be extended to 5.12 seconds and/or 10.24 seconds for the UE in the RRC_INACTIVE state.

According to some aspects of the present disclosure, the UE's ability to monitor paging (i.e., page monitoring or paging monitoring) facilitates the performance of various UE operations. For example, page monitoring allows the UE to learn of updates to system information (e.g., neighbor configuration, cell configuration, etc.), receive calls (e.g., mobile terminated calls), and receive public warning system (PWS) signals (e.g., tsunami, earthquake, and/or Amber alerts). Notably, PWS signals may be life-critical, and therefore, the UE may prefer to receive such signals as soon as possible.

According to a current 3GPP specification, the UE monitors paging every discontinuous reception cycle (DRX cycle). The DRX cycle may be a minimum of a default paging cycle, a UE-specific DRX cycle, and a RAN paging cycle (DRX cycle=min{defaultPagingCycle, UE-specific DRX cycle, ran-PagingCycle}). The UE-specific DRX cycle may be configured by a non-access stratum (NAS) (e.g., via registration procedure or radio resource control (RRC) layer release) or a customer-configured value. The RAN paging cycle may be specific to an inactive state.

Notably, based on the DRX cycle used, the UE may wake up too often (e.g., with a short periodicity) to monitor paging. This may result in the UE unnecessarily utilizing a large amount of power, but may also increase the chance of the UE receiving life-critical PWS signals. Alternatively, the UE may wake up less often (e.g., with a long periodicity) to monitor paging based on the DRX cycle used. This may result in the UE utilizing less power, but may also cause the UE to miss paging signals including life-critical PWS signals, which is not desired. Accordingly, the present disclosure provides a novel approach to page monitoring that balances power saving and PWS signal monitoring.

In an aspect, a network may configure different DRX cycles and establish rules for a UE to determine the DRX cycles based on a UE type. For example, for UEs capable of receiving PWS signals (i.e., PWS-capable UEs), the network may configure a normal (or relatively short) DRX cycle and allow the UE to monitor paging based on a minimum value operation (e.g., monitor paging based on the minimum one of a default paging cycle, a RAN paging cycle, and the configured DRX cycle). In another example, for UEs not capable of receiving PWS signals (i.e., non-PWS-capable UEs), the network may configure a relatively long DRX cycle and instruct the UE to monitor paging associated with the configured DRX cycle alone and not the minimum value operation.

In an aspect, the network operations described above may involve revising a 3GPP standard specification. For example, a largest paging cycle value may be extended/increased to a value larger that "rf256", i.e., 2.56 seconds. As shown for example in FIG. 7, the paging cycle value may be increased to 5.12 seconds and/or 10.24 seconds in the 3GPP standard specification.

In a further aspect, the configuring of different DRX cycles may be affected by location-based information. Location-based information may include earthquake and tsunami warning system (ETWS) information. ETWS information signals are transmitted during rare events, such as earthquakes and tsunamis. Moreover, certain regions around the world (e.g., Japan) may have relatively higher probabilities of experiencing such events as compared to other regions based on typical crustal movement patterns, which are very slow changing.

Location-based information may also include cellular messaging alert system (CMAS) information (e.g., Amber alert). CMAS information may also be region/operator dependent, as some countries/regions may utilize such system while others may not.

In an aspect, a network may be expected to correctly configure a DRX cycle for "high-risk" regions (e.g., regions having a high probability of communicating PWS/ETWS information signals). For example, the network may configure a relatively short page monitoring cycle and/or allow the UE to receive paging based on a minimum paging cycle value among all DRX cycle lengths available to the UE. However, the following problems may still occur: 1) the network may unintentionally misconfigure a long DRX cycle and enforce the UE to apply such long DRX cycle; and/or 2) while traveling, the UE has not yet received an updated configuration for a shorter-length DRX cycle and a PWS signal is due to be received shortly.

In an aspect, the UE may adapt/update a PWS capability based on a location and the UE's own knowledge. The UE can update its capability between "PWS-capable" and "non-PWS-capable" based on: 1) where the UE is located; and/or 2) the UE's knowledge of whether a natural disaster, such as an earthquake or tsunami, will occur in the near future (e.g., based on a forecast provided by a professional agency/bureau). The UE may update its PWS-capability by performing, for example, a NAS registration/capability update procedure.

In another aspect, the UE may adapt/update a paging cycle using a historical configuration and location information. For example, the UE may store: 1) historically configured paging cycle information per region; and 2) a set of flagged high-risk regions (e.g., regions having a high probability of earthquake, tsunami, etc. or high probability of communicating PWS/ETWS information signals). Accordingly, when the UE travels to any of the high-risk regions and the network does not correctly configure the DRX cycle to account for a high-risk region, the UE may choose to receive paging based on a paging cycle value determined by locally applying a minimum value operation (as described above) or directly applying a historically configured paging cycle value (which would have a relatively shorter length).

In an aspect, when the UE adapts/updates a PWS capability or paging cycle as described above, the UE may identify a region in which the UE is located using public land mobile network (PLMN), mobile country code (MCC), and or Global Positioning System (GPS) information. This is useful when the UE is traveling across different countries and/or in and out the high-risk regions.

According to some aspects of the disclosure, a gNB may enable/disable the network's ability to configure a DRX cycle value (e.g., based on a UE's PWS capability). The gNB may also enable/disable the UE's ability to adapt/update PWS capability and/or adapt/update paging cycles. For example, the gNB may enable or disable via a SIB1 message. gNB capability may also be signaled in the SIB1 message, but may be separate for inactive (RAN) versus idle (core network) paging. The gNB may inform users of the enablement/disablement by sending a SIB update indication indicating to the users to read the SIB1 message. When the ability to configure/adapt/update paging cycles based on a UE's PWS capability is disabled, the UE may start monitoring for paging according to a legacy paging cycle, i.e., the minimum one of the UE-specific and default paging cycles.

In an aspect, an AMF is aware of UEs that camp in a tracking area. As such, the AMF may inform all gNBs in the tracking area of the existence of UEs that monitor for paging according to longer cycles. Based on this information, the gNBs may broadcast warning messages (PWS/ETWS signals) and SIB updates for a longer duration. For example, if a gNB is aware of such UEs, when an earthquake or tsunami occurs, the gNB may send a PWS/ETWS signal for a longer amount of time to increase the probability of the UEs receiving the signal.

In an aspect, configuring/adapting/updating the DRX cycle according to PWS capability is enabled/disabled by the network based on UE support and traffic. Considerations include: 1) supported/requested/allowed slices; 2) Internet of Things (IoT) device versus regular UE; 3) UE's mobility characteristics; and 4) other UE requests (e.g., battery savings).

For core network (CN) paging, an AMF may inform a gNB with the UE's paging cycle when the CN initiates a page (entire tracking area). For RAN paging, an anchor gNB may inform other gNBs in the RAN paging area of the UE's paging cycle when the RAN initiates a page. Enabling/disabling may be performed via NAS (e.g., Registration procedure) and RRC (e.g., RNAU). In the latter case, the gNB informs the AMF.

In a further aspect, if a UE-specific DRX cycle is longer than a broadcast control channel (BCCH) modification period, the UE may read a system information block message (e.g., SIB1) upon wakeup to determine if system information has been updated. The UE will update with any new system information if present in the system information block message.

In an aspect, if there is no prior record, the UE may derive a paging repetition pattern over a period of time (T_derive). T_derive acts as a timer and may be a predefined and configurable value. For example, T_derive=X seconds. Alternatively, because the UE may need a few (or several) DRX cycles to derive the paging repetition pattern, T_derive may be based on a number of DRX cycles, e.g., T_derive=(N_drx)*(DRX cycle length/value), where N_drx is a number of DRX cycles used by the UE to derive the paging repetition pattern. During the period T_derive, the UE may wake every DRX cycle and determine whether a paging signal was received. As such, the UE will detect whether a paging signal was received in a first DRX cycle, a second DRX cycle, etc., until a last DRX cycle before the expiration of T_derive. After a particular number of DRX cycles (e.g., 20 DRX cycles), the UE will have a sufficient amount of information to derive the repetition pattern.

In an aspect, once the paging repetition pattern is derived, the UE may save power by selectively waking (waking less often) to monitor paging instead of waking every DRX cycle. That is, the UE only wakes for a DRX cycle in which the UE believes a paging signal will be received according to the paging repetition pattern. The derived paging repetition pattern may be recorded in a database and used for future reference, thus saving the UE further power since the UE will not have to derive the pattern again.

In an aspect, a paging repetition pattern for a cell (and a specific network operator) can be saved/recorded/stored in a database in association with different types of information to help the UE locate a correct pattern. For example, the paging repetition pattern may be stored in association with a cell location, a cell identity, a mobile country code (MCC), GPS information, a network operator, a network vendor, and/or time of day/month/year (since some PWS messages can be season-dependent). The database may also store any known network repetition pattern that the UE may have acquired before-hand (e.g., by explicitly asking a network or network operator offline). Notably, if the UE previously knows the network repetition pattern, then the UE can significantly shorten the amount of time needed to derive the paging repetition pattern. For example, time is saved when the UE already knows that a paging repetition pattern will repeat every X DRX cycles (e.g., 2 DRX cycles) based on a stored network repetition pattern, and therefore, will only need to expend time determining a starting point of the pattern (e.g., whether the pattern starts in a first DRX cycle, a second DRX cycle, etc.). The information stored in the database assists the UE to uniquely detect, when camping on a cell, where the UE will likely experience a particular paging repetition pattern. The more information the UE can access, the more accurate the UE can be in assessing from the database what the paging repetition pattern will be.

In general, a network may divide a PWS message into multiple segments and send the segments to the UE. Moreover, a sequence number or index of the segment is embedded in a PWS signal itself. Thus, a UE is not made aware of the sequence number or index of the PWS signal until the PWS signal is decoded. Consequently, the UE may unnecessarily wake to receive the PWS signal if the PWS signal is of a sequence number or index that the UE has already received or is not interested in receiving.

In an aspect, to avoid having the UE unnecessarily wake to receive an unwanted PWS signal, the network may embed the sequence number or index of a PWS signal in a corresponding paging signal transmitted prior to the PWS signal. Accordingly, when the UE receives a paging signal having embedded therein a sequence number or index of an upcoming PWS signal, the UE can determine its interest in receiving the upcoming PWS signal based on the sequence number or index embedded in the paging signal. If the UE is interested in receiving the upcoming PWS signal based on the sequence number or index of the PWS signal embedded in the paging signal, the UE may wake to receive the PWS signal. If the UE is not interested in receiving the upcoming PWS signal based on the sequence number or index of the PWS signal embedded in the paging signal, the UE may refrain from waking and forgo receiving the PWS signal, which saves power.

Figure 8:
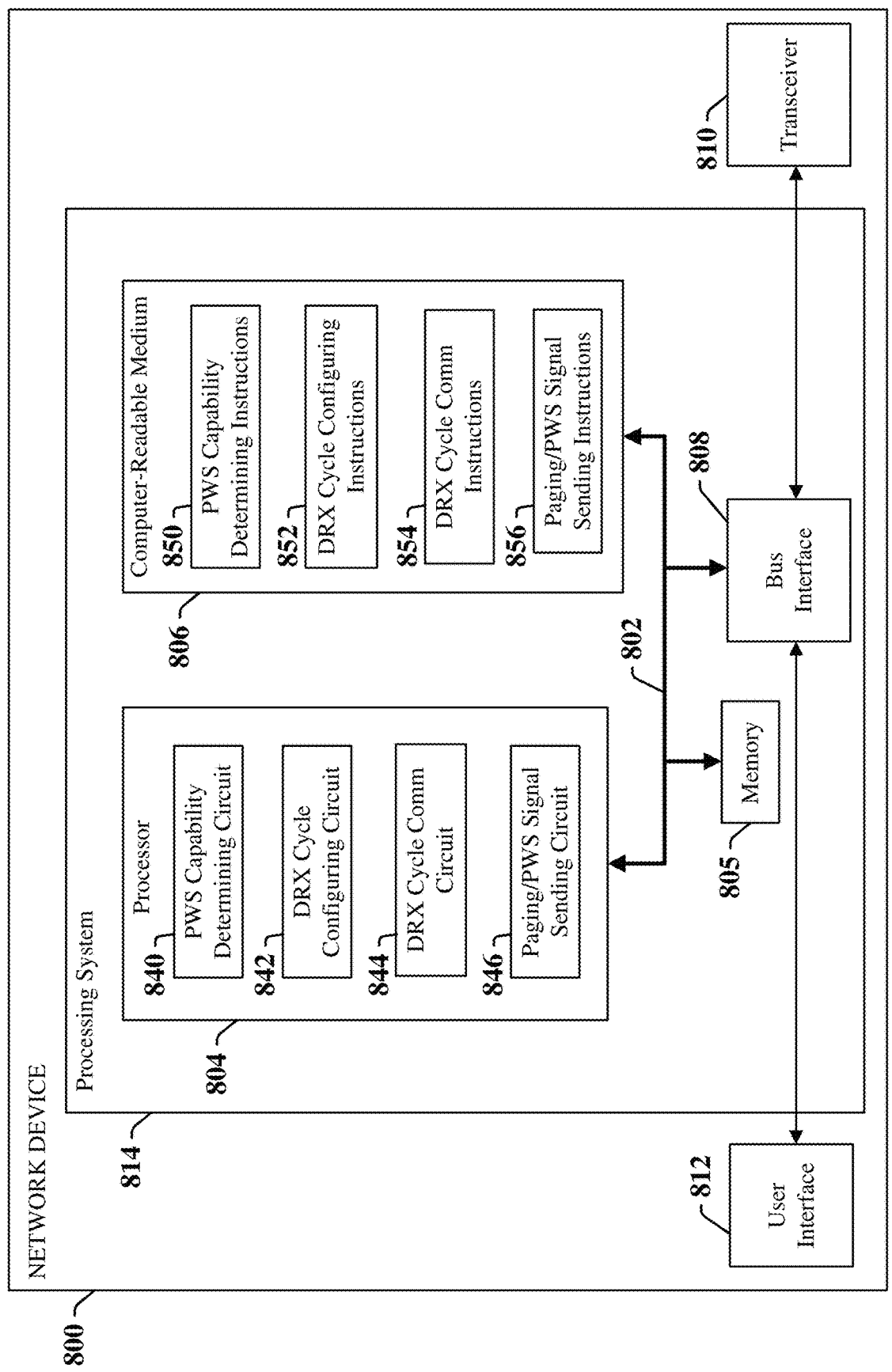
FIG. 8 is a block diagram conceptually illustrating an example of a hardware implementation for a network device according to some aspects of the disclosure.

FIG. 8 is a block diagram illustrating an example of a hardware implementation for a network device 800 employing a processing system 814. For example, the network device 800 may be a scheduling entity, base station, gNB, AMF, or a combination of the gNB and AMF, as illustrated in any one or more of FIGS. 1, 2, 5, and/or 6.

The network device 800 may be implemented with a processing system 814 that includes one or more processors 804. Examples of processors 804 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the network device 800 may be configured to perform any one or more of the functions described herein. That is, the processor 804, as utilized in a network device 800, may be used to implement any one or more of the processes and procedures described below and illustrated in FIG. 9.

In this example, the processing system 814 may be implemented with a bus architecture, represented generally by the bus 802. The bus 802 may include any number of interconnecting buses and bridges depending on the specific application of the processing system 814 and the overall design constraints. The bus 802 communicatively couples together various circuits including one or more processors (represented generally by the processor 804), a memory 805, and computer-readable media (represented generally by the computer-readable medium 806). The bus 802 may also link various other circuits such as timing sources, peripherals, voltage regulators, and power management circuits, which are well known in the art, and therefore, will not be described any further. A bus interface 808 provides an interface between the bus 802 and a transceiver 810. The transceiver 810 provides a communication interface or means for communicating with various other apparatus over a transmission medium. Depending upon the nature of the apparatus, a user interface 812 (e.g., keypad, display, speaker, microphone, joystick) may also be provided. Of course, such a user interface 812 is optional, and may be omitted in some examples, such as a base station.

In some aspects of the disclosure, the processor 804 may include public warning system (PWS) capability determining circuitry 840 configured for various functions, including, for example, determining whether a user equipment (UE) is capable of receiving a public warning system (PWS) signal and whether the UE desires to receive the PWS signal within a duration (specific period of time). For example, the PWS capability determining circuitry 840 may be configured to implement one or more of the functions described below in relation to FIG. 9, including, e.g., block 902. The processor 804 may also include DRX cycle configuring circuitry 842 configured for various functions, including, for example, configuring a discontinuous reception (DRX) cycle value based on the determination. For example, the DRX cycle configuring circuitry 842 may be configured to implement one or more of the functions described below in relation to FIG. 9, including, e.g., block 904. The processor 804 may also include DRX cycle communicating circuitry 844 configured for various functions, including, for example, sending the configured DRX cycle value to the UE and a radio access network (RAN). For example, the DRX cycle communicating circuitry 844 may be configured to implement one or more of the functions described below in relation to FIG. 9, including, e.g., block 906. The processor 804 may also include paging/PWS signal sending circuitry 846 configured for various functions, including, for example, sending, to the UE, a paging signal corresponding to the PWS signal based on the configured DRX cycle value, and sending the PWS signal to the UE. For example, the paging/PWS signal sending circuitry 846 may be configured to implement one or more of the functions described below in relation to FIG. 9, including, e.g., blocks 908 and 910.

The processor 804 is responsible for managing the bus 802 and general processing, including the execution of software stored on the computer-readable medium 806. The software, when executed by the processor 804, causes the processing system 814 to perform the various functions described below for any particular apparatus. The computer-readable medium 806 and the memory 805 may also be used for storing data that is manipulated by the processor 804 when executing software.

One or more processors 804 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 806. The computer-readable medium 806 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 806 may reside in the processing system 814, external to the processing system 814, or distributed across multiple entities including the processing system 814. The computer-readable medium 806 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

In one or more examples, the computer-readable storage medium 806 may include public warning system (PWS) capability determining instructions 850 configured for various functions, including, for example, determining whether a user equipment (UE) is capable of receiving a public warning system (PWS) signal and whether the UE desires to receive the PWS signal within a duration (specific period of time). For example, the PWS capability determining instructions 850 may be configured to implement one or more of the functions described below in relation to FIG. 9, including, e.g., block 902. The computer-readable storage medium 806 may also include DRX cycle configuring instructions 852 configured for various functions, including, for example, configuring a discontinuous reception (DRX) cycle value based on the determination. For example, the DRX cycle configuring instructions 852 may be configured to implement one or more of the functions described below in relation to FIG. 9, including, e.g., block 904. The computer-readable storage medium 806 may also include DRX cycle communicating instructions 854 configured for various functions, including, for example, sending the configured DRX cycle value to the UE and a radio access network (RAN). For example, the DRX cycle communicating instructions 854 may be configured to implement one or more of the functions described below in relation to FIG. 9, including, e.g., block 906. The computer-readable storage medium 806 may also include paging/PWS signal sending instructions 856 configured for various functions, including, for example, sending, to the UE, a paging signal corresponding to the PWS signal based on the configured DRX cycle value, and sending the PWS signal to the UE. For example, the paging/PWS signal sending instructions 856 may be configured to implement one or more of the functions described below in relation to FIG. 9, including, e.g., blocks 908 and 910.

Figure 9:
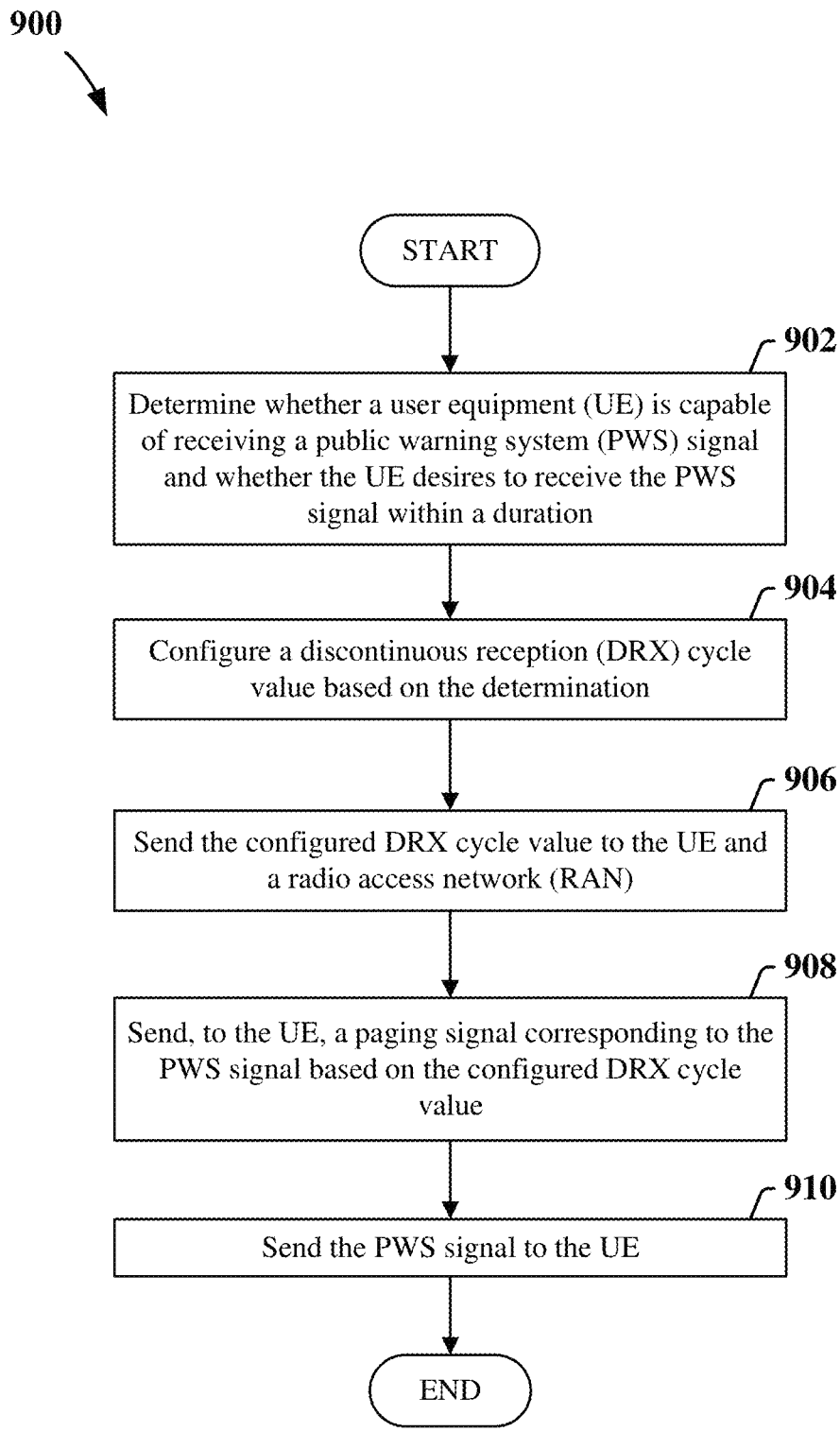
FIG. 9 is a flow chart illustrating an exemplary process for wireless communication at a network device according to some aspects of the disclosure.

FIG. 9 is a flow chart illustrating an exemplary process 900 for wireless communication at a network device in accordance with some aspects of the present disclosure. As described below, some or all illustrated features may be omitted in a particular implementation within the scope of the present disclosure, and some illustrated features may not be required for implementation of all embodiments. In some examples, the process 900 may be carried out by the network device 800 illustrated in FIG. 8. In some examples, the process 900 may be carried out by any suitable apparatus or means for carrying out the functions or algorithm described below.

At block 902, the network device may determine whether a user equipment (UE) is capable of receiving a public warning system (PWS) signal and whether the UE desires to receive the PWS signal within a duration (specific period of time). In an aspect, the determination may include receiving an indication of PWS-capability or non-PWS-capability from the UE. The determination may further include receiving a delay requirement via the received indication to determine whether the UE desires to receive the PWS signal within a duration. In a further aspect, the indication may request a configured discontinuous reception (DRX) cycle value (e.g., UE-specific DRX cycle value) from the network device. Moreover, the indication may be received via a non-access stratum (NAS) registration procedure or a capability update procedure.

At block 904, the network device may configure a discontinuous reception (DRX) cycle value based on the determination. At block 906, the network device may send the configured DRX cycle value to the UE and a radio access network (RAN).

In an aspect, if the UE is capable of receiving the PWS signal and desires to receive the PWS signal within a duration, the configured DRX cycle value is a first DRX cycle value and the sending of the configured DRX cycle value indicates to the UE that the UE is allowed to receive a paging signal based on a minimum one of the first DRX cycle value, a default DRX cycle value (default paging cycle), and a RAN configured DRX cycle value (RAN paging cycle). In an aspect, the first DRX cycle value may be greater than or equal to 5.12 seconds (e.g., 5.12 seconds or 10.24 seconds).

In a further aspect, if the UE is not capable of receiving the PWS signal or does not desire to receive the PWS signal within a duration, the configured DRX cycle value is a second DRX cycle value. Moreover, the sending of the configured DRX cycle value indicates to the UE that the UE: 1) is not allowed to receive the paging signal based on a minimum one of the second DRX cycle value, the default DRX cycle value, and the RAN configured DRX cycle value; and 2) is to receive the paging signal based on the second DRX cycle value. In an aspect, the second DRX cycle value may be greater than or equal to 5.12 seconds (e.g., 5.12 seconds or 10.24 seconds).

At block 908, the network device may send, to the UE, the paging signal corresponding to the PWS signal based on the configured DRX cycle value. In an aspect, the network device may include a sequence number or index of the corresponding PWS signal in the paging signal. At block 910, the network may send the PWS signal to the UE.

In an aspect, when the network device determines whether the UE is capable of receiving the PWS signal (block 902), the network device may determine that the UE monitors paging according to an established paging duration. Accordingly, the network device may send the paging signal to the UE (block 908) for a duration at least as long as the established paging duration.

The process shown in FIG. 9 may include additional aspects, such as any single aspect or any combination of aspects described below and/or in connection with one or more other processes described elsewhere herein.

In a first aspect, the network device may determine whether a user equipment (UE) is capable of receiving a public warning system (PWS) signal and whether the UE desires to receive the PWS signal within a duration. The network device may configure a discontinuous reception (DRX) cycle value based on the determination and send the configured DRX cycle value to the UE and a radio access network (RAN). The network device may further send, to the UE, a paging signal corresponding to the PWS signal based on the configured DRX cycle value.

In a second aspect, alone or in combination with the first aspect, if the UE is capable of receiving the PWS signal and desires to receive the PWS signal within a duration, then the configured DRX cycle value is a first DRX cycle value and the sending of the configured DRX cycle value indicates to the UE that the UE is allowed to receive the paging signal based on a minimum one of the first DRX cycle value, a default DRX cycle value, and a RAN configured DRX cycle value.

In a third aspect, alone or in combination with one or more of the first and second aspects, if the UE is not capable of receiving the PWS signal or does not desire to receive the PWS signal within a duration, then the configured DRX cycle value is a second DRX cycle value and the sending of the configured DRX cycle value indicates to the UE that the UE is not allowed to receive the paging signal based on a minimum one of the second DRX cycle value, the default DRX cycle value, and the RAN configured DRX cycle value, and is to receive the paging signal based on the second DRX cycle value.

In a fourth aspect, alone or in combination with one or more of the first through third aspects, the network device may determine whether the UE is capable of receiving the PWS signal by receiving an indication of PWS-capability or non-PWS-capability from the UE, and may determine whether the UE desires to receive the PWS signal within a duration by receiving a delay requirement via the received indication.

In a fifth aspect, alone or in combination with one or more of the first through fourth aspects, the indication requests the configured DRX cycle value from the network device, and the indication is received via a non-access stratum (NAS) registration procedure or a capability update procedure.

In a sixth aspect, alone or in combination with one or more of the first through fifth aspects, the network device may determine whether the UE is capable of receiving the PWS signal by determining that the UE monitors paging according to an established paging duration, and may send the paging signal by sending the paging signal to the UE for a paging duration at least as long as the established paging duration.

In a seventh aspect, alone or in combination with one or more of the first through sixth aspects, the paging signal includes a sequence number or index of the PWS signal corresponding to the paging signal.

In one configuration, the apparatus 800 for wireless communication includes means for determining whether a user equipment (UE) is capable of receiving a public warning system (PWS) signal and whether the UE desires to receive the PWS signal within a duration, means for configuring a discontinuous reception (DRX) cycle value based on the determination, means for sending the configured DRX cycle value to the UE and a radio access network (RAN), means for sending, to the UE, a paging signal corresponding to the PWS signal based on the configured DRX cycle value, and means for sending the PWS signal to the UE. In one aspect, the aforementioned means may be the processor 804 shown in FIG. 8 configured to perform the functions recited by the aforementioned means. In another aspect, the aforementioned means may be a circuit or any apparatus configured to perform the functions recited by the aforementioned means.

Of course, in the above examples, the circuitry included in the processor 804 is merely provided as an example, and other means for carrying out the described functions may be included within various aspects of the present disclosure, including but not limited to the instructions stored in the computer-readable storage medium 806, or any other suitable apparatus or means described in any one of the FIGS. 1, 2, 5, and/or 6, and utilizing, for example, the processes and/or algorithms described herein in relation to FIG. 9.

Figure 10:
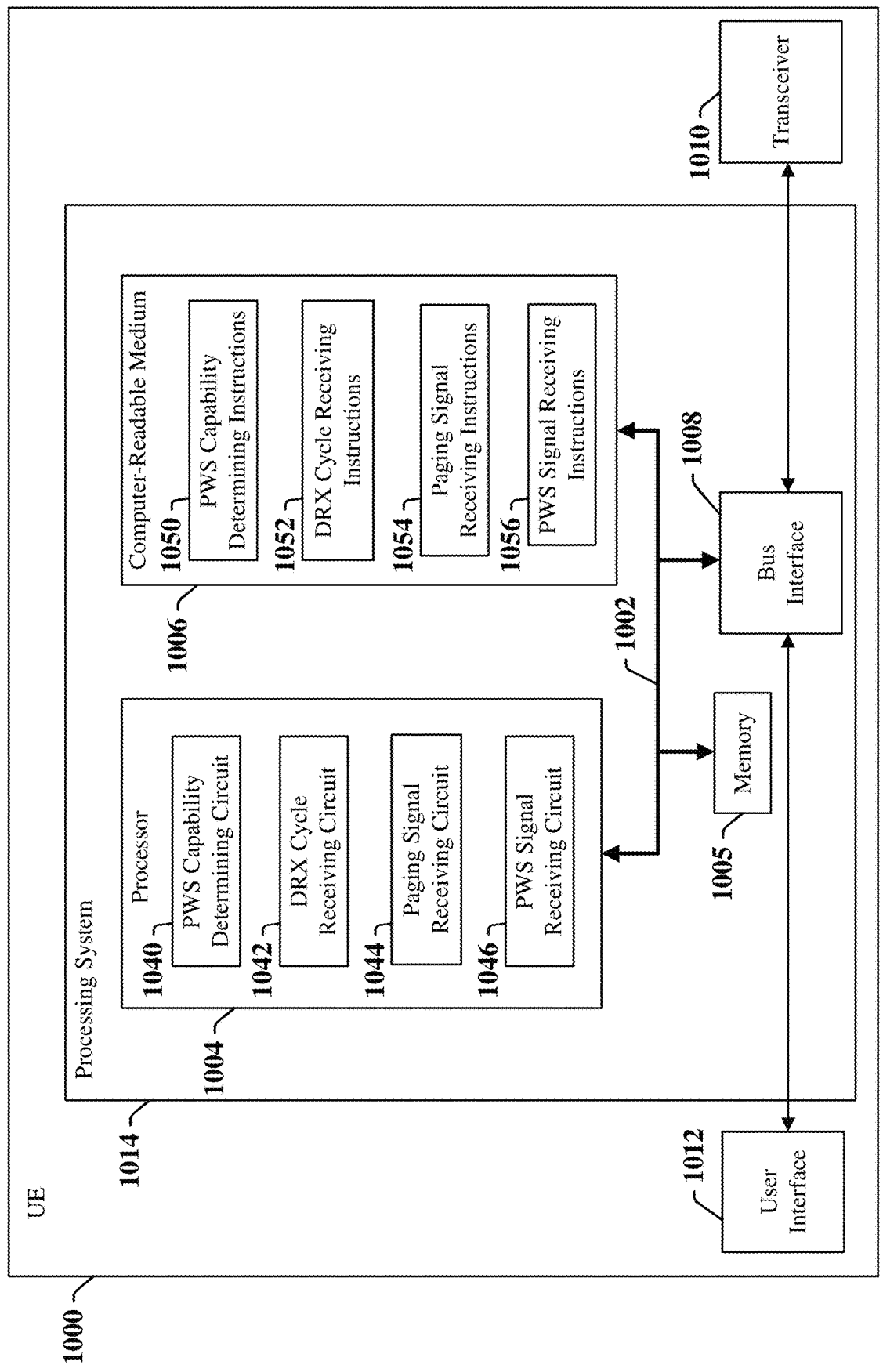
FIG. 10 is a block diagram conceptually illustrating an example of a hardware implementation for a UE according to some aspects of the disclosure.

FIG. 10 is a conceptual diagram illustrating an example of a hardware implementation for an exemplary UE 1000 employing a processing system 1014. In accordance with various aspects of the disclosure, an element, or any portion of an element, or any combination of elements may be implemented with a processing system 1014 that includes one or more processors 1004. For example, the UE 1000 may be a user equipment (UE) as illustrated in any one or more of FIGS. 1, 2, 5, and/or 6.

The processing system 1014 may be substantially the same as the processing system 814 illustrated in FIG. 8, including a bus interface 1008, a bus 1002, memory 1005, a processor 1004, and a computer-readable medium 1006. Furthermore, the UE 1000 may include a user interface 1012 and a transceiver 1010 substantially similar to those described above in FIG. 8. That is, the processor 1004, as utilized in a UE 1000, may be used to implement any one or more of the processes described below and illustrated in FIG. 11.

In some aspects of the disclosure, the processor 1004 may include public warning system (PWS) capability determining circuitry 1040 configured for various functions, including, for example, determining a capability of receiving a PWS signal and/or a delay requirement specifying whether the UE desires to receive the PWS signal within a duration (specific period of time) and sending an indication to a network device indicating the capability and/or the delay requirement. For example, the PWS capability determining circuitry 1040 may be configured to implement one or more of the functions described below in relation to FIG. 11, including, e.g., blocks 1102 and 1104. The processor 1004 may also include DRX cycle receiving circuitry 1042 configured for various functions, including, for example, receiving, from the network device, a configured discontinuous reception (DRX) cycle associated with the indication. For example, the DRX cycle receiving circuitry 1042 may be configured to implement one or more of the functions described below in relation to FIG. 11, including, e.g., block 1106. The processor 1004 may also include paging signal receiving circuitry 1044 configured for various functions, including, for example, receiving, from the network device, a paging signal corresponding to the PWS signal (e.g., associated with the configured DRX cycle value). For example, the paging signal receiving circuitry 1044 may be configured to implement one or more of the functions described below in relation to FIG. 11, including, e.g., block 1108. The processor 1004 may also include PWS signal receiving circuitry 1046 configured for various functions, including, for example, receiving the PWS signal from the network device. Moreover, if the paging signal includes a sequence number or index of the PWS signal corresponding to the paging signal, the PWS signal receiving circuitry 1046 may also be configured for determining whether to receive the PWS signal based on the sequence number or index included in the paging signal, waking to receive the PWS signal if the PWS signal is determined to be received based on the sequence number or index, and refraining from waking to receive the PWS signal if the PWS signal is determined not to be received based on the sequence number or index. For example, the PWS signal receiving circuitry 1046 may be configured to implement one or more of the functions described below in relation to FIG. 11, including, e.g., blocks 1110, 1112, 1114, and 1116.

In one or more examples, the computer-readable storage medium 1006 may include public warning system (PWS) capability determining instructions 1050 configured for various functions, including, for example, determining a capability of receiving a PWS signal and/or a delay requirement specifying whether the UE desires to receive the PWS signal within a duration (specific period of time) and sending an indication to a network device indicating the capability and/or the delay requirement. For example, the PWS capability determining instructions 1050 may be configured to implement one or more of the functions described below in relation to FIG. 11, including, e.g., blocks 1102 and 1104. The computer-readable storage medium 1006 may also include DRX cycle receiving instructions 1052 configured for various functions, including, for example, receiving, from the network device, a configured discontinuous reception (DRX) cycle value associated with the indication. For example, the DRX cycle receiving instructions 1052 may be configured to implement one or more of the functions described below in relation to FIG. 11, including, e.g., block 1106. The computer-readable storage medium 1006 may also include paging signal receiving instructions 1054 configured for various functions, including, for example, receiving, from the network device, a paging signal corresponding to the PWS signal (e.g., associated with the configured DRX cycle value). For example, the paging signal receiving instructions 1054 may be configured to implement one or more of the functions described below in relation to FIG. 11, including, e.g., block 1108. The computer-readable storage medium 1006 may also include PWS signal receiving instructions 1056 configured for various functions, including, for example, receiving the PWS signal from the network device. Moreover, if the paging signal includes a sequence number or index of the PWS signal corresponding to the paging signal, the PWS signal receiving instructions 1056 may also be configured for determining whether to receive the PWS signal based on the sequence number or index included in the paging signal, waking to receive the PWS signal if the PWS signal is determined to be received based on the sequence number or index, and refraining from waking to receive the PWS signal if the PWS signal is determined not to be received based on the sequence number or index. For example, the PWS signal receiving instructions 1056 may be configured to implement one or more of the functions described below in relation to FIG. 11, including, e.g., blocks 1110, 1112, 1114, and 1116.

Figure 11:
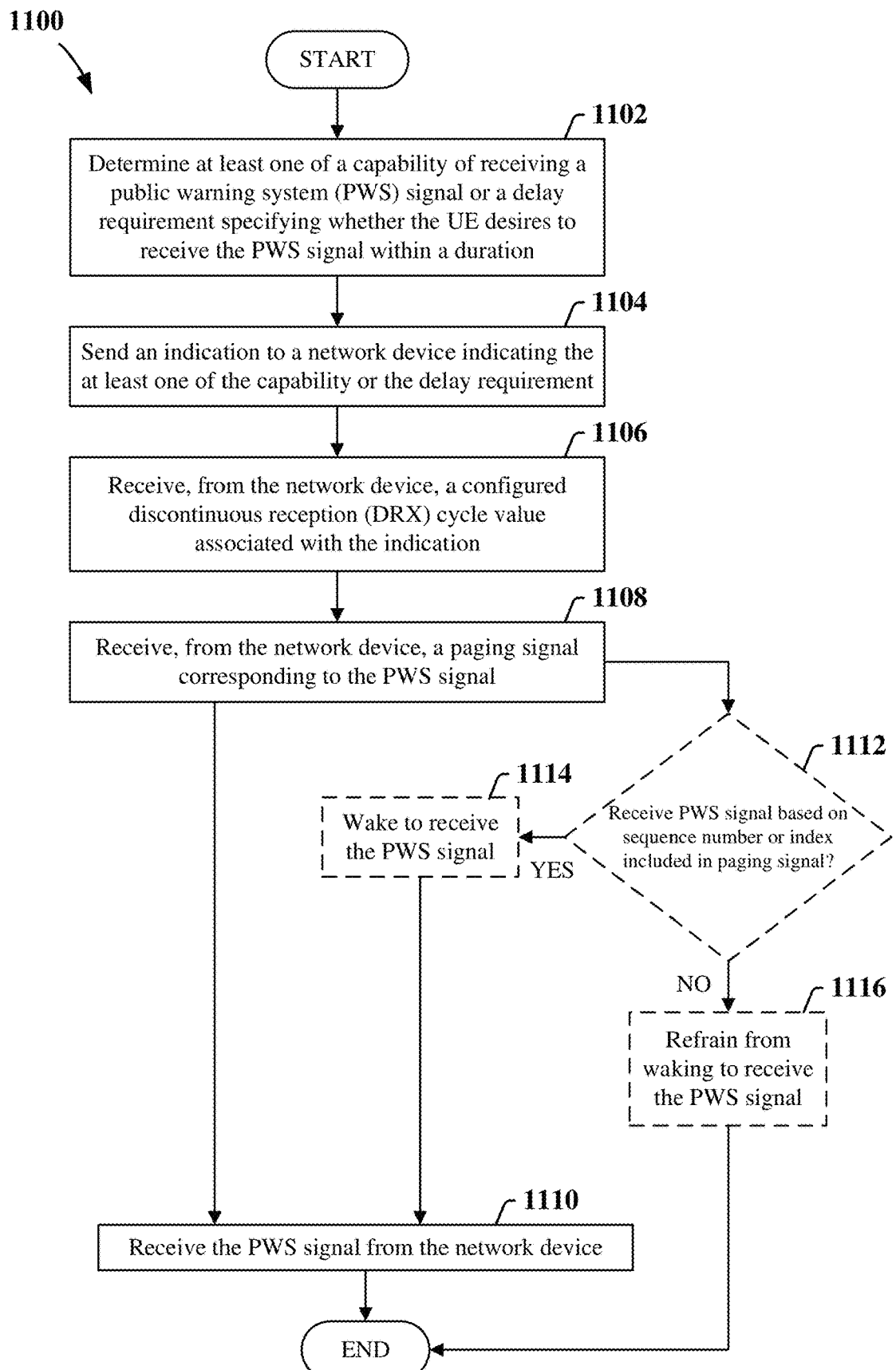
FIG. 11 is a flow chart illustrating an exemplary process for wireless communication at a UE according to some aspects of the disclosure.

FIG. 11 is a flow chart illustrating an exemplary process 1100 for wireless communication at a user equipment (UE) in accordance with some aspects of the present disclosure. As described below, some or all illustrated features may be omitted in a particular implementation within the scope of the present disclosure, and some illustrated features may not be required for implementation of all embodiments. In some examples, the process 1100 may be carried out by the UE 1000 illustrated in FIG. 10. In some examples, the process 1100 may be carried out by any suitable apparatus or means for carrying out the functions or algorithm described below.

At block 1102, the UE may determine a capability of receiving a public warning system (PWS) signal and/or a delay requirement specifying whether the UE desires to receive the PWS signal within a duration (specific period of time). In an aspect, the delay requirement signals that the UE is configured (or not configured) to receive the PWS signal during a time window. In an aspect, the PWS capability and/or the delay requirement may be determined based on a region (e.g., geographic region) in which the UE is located and/or knowledge of the UE on whether an event prompting transmission of the PWS signal (e.g., earthquake, tsunami, etc.) will occur. The region may be determined, for example, using public land mobile network (PLMN), mobile country code (MCC), and or Global Positioning System (GPS) information.

At block 1104, the UE may send an indication to a network device indicating the capability of receiving the PWS signal and/or the delay requirement. In an aspect, the indication may request a configured discontinuous reception (DRX) cycle value (e.g., UE-specific DRX cycle value) from the network device. Moreover, the indication may be sent via a non-access stratum (NAS) registration procedure or a capability update procedure.

At block 1106, the UE may receive, from the network device, a configured discontinuous reception (DRX) cycle value associated with the indication. At block 1108, the UE may receive, from the network device, a paging signal corresponding to the PWS signal associated with the configured DRX cycle value.

In an aspect, to receive the paging signal the UE may determine that the UE is located in a region at risk of having occur an event prompting transmission of the PWS signal (e.g., located in a region with a high probability of earthquake, tsunami, etc.), update the configured DRX cycle value with a historic configured DRX cycle value associated with the region, and receive the paging signal from the network device based on the updated DRX cycle value.

In another aspect, to receive the paging signal the UE may determine that the UE is located in a region at risk of having occur an event prompting transmission of the PWS signal and receive the paging signal based on a minimum one of the configured DRX cycle value, a default DRX cycle value (default paging cycle), and a radio access network (RAN) configured DRX cycle value (RAN paging cycle) when the UE is capable of receiving the PWS signal and the delay requirement specifies that the UE desires to receive the PWS signal within a duration. Here, the configured DRX cycle value may be greater than or equal to 5.12 seconds (e.g., 5.12 seconds or 10.24 seconds).

In a further aspect, to receive the paging signal the UE may derive a paging repetition pattern over a duration of N configured DRX cycle values, where N is an integer greater than or equal to 1, selectively wake to receive the paging signal based on the derived paging repetition pattern, and store the derived paging repetition pattern in a database.

In another aspect, if the UE is not capable of receiving the PWS signal or the delay requirement specifies that the UE does not desire to receive the PWS signal within a duration, reception of the configured DRX cycle value indicates that the UE: 1) is not allowed to receive the paging signal based on a minimum one of the configured DRX cycle value, the default DRX cycle value, and the RAN configured DRX cycle value; and 2) is to receive the paging signal based on the configured DRX cycle value. Here, the configured DRX cycle value may be greater than or equal to 5.12 seconds (e.g., 5.12 seconds or 10.24 seconds).

At block 1110, the UE may receive the PWS signal from the network device.

In an aspect, the paging signal (received at block 1108) may include a sequence number or index of the PWS signal corresponding to the paging signal. Accordingly, at block 1112, the UE may determine whether to receive the PWS signal based on the sequence number or index included in the paging signal. At block 1114, the UE may wake to receive the PWS signal if the PWS signal is determined to be received based on the sequence number or index. At block 1116, the UE may refrain from waking to receive the PWS signal if the PWS signal is determined not to be received based on the sequence number or index.

The process shown in FIG. 11 may include additional aspects, such as any single aspect or any combination of aspects described below and/or in connection with one or more other processes described elsewhere herein.

In a first aspect, a UE may send an indication to a network device indicating at least one of a capability of receiving a public warning system (PWS) signal or a delay requirement specifying whether the UE desires to receive the PWS signal within a duration (e.g., the delay requirement signals that the UE is configured (or not configured) to receive the PWS signal during a time window). The UE may receive, from the network device, a configured discontinuous reception (DRX) cycle value associated with the indication. The UE may also receive, from the network device, a paging signal corresponding to the PWS signal associated with the configured DRX cycle value.

In a second aspect, alone or in combination with the first aspect, the UE may determine the at least one of the capability of receiving the PWS signal or the delay requirement based on at least one of a region in which the UE is located or knowledge of the UE on whether an event prompting transmission of the PWS signal will occur.

In a third aspect, alone or in combination with one or more of the first and second aspects, the indication requests the configured DRX cycle value from the network device, and the indication is sent via a non-access stratum (NAS) registration procedure or a capability update procedure.

In a fourth aspect, alone or in combination with one or more of the first through third aspects, the UE may receive the paging signal by determining that the UE is located in a region at risk of having occur an event prompting transmission of the PWS signal, updating the configured DRX cycle value with a historic configured DRX cycle value associated with the region, and receiving the paging signal from the network device based on the updated DRX cycle value.

In a fifth aspect, alone or in combination with one or more of the first through fourth aspects, the UE may receive the paging signal by determining that the UE is located in a region at risk of having occur an event prompting transmission of the PWS signal, and receiving the paging signal based on a minimum one of the configured DRX cycle value, a default DRX cycle value, and a radio access network (RAN) configured DRX cycle value when the UE is capable of receiving the PWS signal and the delay requirement specifies that the UE desires to receive the PWS signal within a duration.

In a sixth aspect, alone or in combination with one or more of the first through fifth aspects, if the UE is not capable of receiving the PWS signal or the delay requirement specifies that the UE does not desire to receive the PWS signal within a duration, reception of the configured DRX cycle value indicates that the UE is not allowed to receive the paging signal based on a minimum one of the configured DRX cycle value, a default DRX cycle value, and a radio access network (RAN) configured DRX cycle value, and is to receive the paging signal based on the configured DRX cycle value.

In a seventh aspect, alone or in combination with one or more of the first through sixth aspects, the UE may receive the paging signal by deriving a paging repetition pattern over a duration of N configured DRX cycle values, where N is an integer greater than or equal to 1, selectively waking to receive the paging signal based on the derived paging repetition pattern, and storing the derived paging repetition pattern in a database.

In an eighth aspect, alone or in combination with one or more of the first through seventh aspects, when the paging signal includes a sequence number or index of the PWS signal corresponding to the paging signal, the UE may determine whether to receive the PWS signal based on the sequence number or index included in the paging signal, wake to receive the PWS signal if the PWS signal is determined to be received based on the sequence number or index, and refrain from waking to receive the PWS signal if the PWS signal is determined not to be received based on the sequence number or index.

In one configuration, the apparatus 1000 for wireless communication includes means for determining a capability of receiving a public warning system (PWS) signal and/or a delay requirement specifying whether the UE desires to receive the PWS signal within a duration, means for sending an indication to a network device indicating the capability of receiving the PWS signal and/or the delay requirement, means for receiving, from the network device, a configured discontinuous reception (DRX) cycle value associated with the indication, means for receiving, from the network device, a paging signal corresponding to the PWS signal associated with the configured DRX cycle value, means for receiving the PWS signal from the network device, and if the paging signal includes a sequence number or index of the PWS signal corresponding to the paging signal: means for determining whether to receive the PWS signal based on the sequence number or index included in the paging signal, means for waking to receive the PWS signal if the PWS signal is determined to be received based on the sequence number or index, and means for refraining from waking to receive the PWS signal if the PWS signal is determined not to be received based on the sequence number or index. In one aspect, the aforementioned means may be the processor 1004 shown in FIG. 10 configured to perform the functions recited by the aforementioned means. In another aspect, the aforementioned means may be a circuit or any apparatus configured to perform the functions recited by the aforementioned means.

Of course, in the above examples, the circuitry included in the processor 1004 is merely provided as an example, and other means for carrying out the described functions may be included within various aspects of the present disclosure, including but not limited to the instructions stored in the computer-readable storage medium 1006, or any other suitable apparatus or means described in any one of the FIGS. 1, 2, 5, and/or 6, and utilizing, for example, the processes and/or algorithms described herein in relation to FIG. 11.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-11 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1-11 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

What is claimed is:

1. A method of wireless communication at a user equipment (UE), comprising:
    sending an indication, to a network device, that includes duration information signaling whether the UE is configured to receive a public warning system (PWS) signal within a duration, wherein the indication further includes a request for a discontinuous reception (DRX) cycle value associated with the PWS signal from the network device;
    receiving, from the network device, a configured DRX cycle value associated with the PWS signal based on the request included in the indication; and
    receiving, from the network device, a paging signal corresponding to the PWS signal associated with the configured DRX cycle value, wherein the reception of the paging signal comprises:
        determining that the UE is located in a region at risk of prompting a transmission of the PWS signal,
        updating the configured DRX cycle value with a historic configured DRX cycle value associated with the region, and
        receiving the paging signal from the network device based on the updated DRX cycle value.

2. The method of claim 1, wherein the indication further includes a capability signaling whether the UE is capable of receiving the PWS signal, the method further comprising determining at least one of the capability or the duration information based on at least one of:

a region in which the UE is located; or knowledge of the UE on whether an event prompting the transmission of the PWS signal will occur.

3. The method of claim 1, wherein:

sending the indication comprises sending via a non-access stratum (NAS) registration procedure or a capability update procedure.

4. The method of claim 1, wherein the reception of the paging signal comprises:

deriving a paging repetition pattern over a period of time, where the period of time is equal to N configured DRX cycle values, and where N is an integer greater than 1; and selectively waking to receive the paging signal based on the derived paging repetition pattern.

5. The method of claim 1, wherein the paging signal includes a sequence number or an index of the PWS signal corresponding to the paging signal, the method further comprising:

receiving the PWS signal based on the sequence number or the index.

6. A user equipment (UE) for wireless communication, comprising:

a transceiver;

a memory comprising instructions; and at least one processor configured to execute the instructions and cause the UE to:

send, via the transceiver, an indication to a network device, the indication including duration information signaling whether the UE is configured to receive a public warning system (PWS) signal within a duration, wherein the indication further includes a request for a discontinuous reception (DRX) cycle value associated with the PWS signal from the network device, receive, via the transceiver, from the network device a configured DRX cycle value associated with the PWS signal based on the request included in the indication, and receive, via the transceiver, from the network device a paging signal corresponding to the PWS signal associated with the configured DRX cycle value, wherein the at least one processor configured to receive the paging signal is further configured to:

determine that the UE is located in a region at risk of prompting a transmission of the PWS signal, update the configured DRX cycle value with a historic configured DRX cycle value associated with the region, and receive the paging signal from the network device based on the updated DRX cycle value.

7. The UE of claim 6, wherein the indication further includes a capability signaling whether the UE is capable of receiving the PWS signal, wherein the at least one processor is further configured to determine at least one of the capability or the duration information based on at least one of:

a region in which the UE is located; or knowledge of the UE on whether an event prompting the transmission of the PWS signal will occur.

8. The UE of claim 6, wherein:

the at least one processor is configured to send, via the transceiver, the indication via a non-access stratum (NAS) registration procedure or a capability update procedure.

9. The UE of claim 6, wherein the at least one processor configured to receive the paging signal is further configured to:

derive a paging repetition pattern over a period of time, where the period of time is equal to N configured DRX cycle values, and where N is an integer greater than 1; and selectively wake to receive the paging signal based on the derived paging repetition pattern.

10. The UE of claim 6, wherein the paging signal includes a sequence number or an index of the PWS signal corresponding to the paging signal, the at least one processor further configured to:

receive, via the transceiver, the PWS signal based on the sequence number or the index.

11. A method of wireless communication at a network device, comprising:

receiving, from a user equipment (UE), an indication that includes duration information signaling whether the UE is configured to receive a public warning system (PWS) signal within a duration, wherein the indication further includes a request for a discontinuous reception (DRX) cycle value associated with the PWS signal from the network device;

determining whether the UE is configured to receive the PWS signal within the duration based on the indication;

configuring the DRX cycle value for the PWS signal based on the determination and the request included in the indication;

sending the configured DRX cycle value to the UE;

configuring the UE to update, for a paging signal corresponding to the PWS signal, the configured DRX cycle value with a historic configured DRX cycle value when the UE is located in a region at risk of prompting a transmission of the PWS signal; and sending, to the UE, the paging signal corresponding to the PWS signal based on the configured DRX cycle value.

12. The method of claim 11, further comprising determining whether the UE is capable of receiving the PWS signal based on the indication, wherein if the UE is at least one of capable of receiving the PWS signal or configured to receive the PWS signal within the duration:

the configured DRX cycle value is a first DRX cycle value; and the sending of the configured DRX cycle value indicates to the UE that the UE is allowed to receive the paging signal based on a minimum one of the first DRX cycle value, a default DRX cycle value, or a radio access network (RAN) configured DRX cycle value.

13. The method of claim 12, wherein if the UE is not capable of receiving the PWS signal or is not configured to receive the PWS signal within the duration:

the configured DRX cycle value is a second DRX cycle value; and the sending of the configured DRX cycle value indicates to the UE that the UE:

is to receive the paging signal based on the second DRX cycle value.

14. The method of claim 12, wherein:

the indication further indicates information regarding PWS-capability or non-PWS-capability.

15. The method of claim 14, wherein:

the indication is received via a non-access stratum (NAS) registration procedure or a capability update procedure.

16. The method of claim 12, wherein:

the determining whether the UE is capable of receiving the PWS signal includes determining that the UE monitors paging according to an established paging duration; and the sending the paging signal includes sending the paging signal to the UE for a paging duration at least as long as the established paging duration.

17. The method of claim 11, wherein the paging signal includes a sequence number or index of the PWS signal corresponding to the paging signal.

18. A network device for wireless communication, comprising:
a transceiver;
a memory comprising instructions; and
at least one processor configured to execute the instructions and cause the network device to:
receive, via the transceiver, an indication from a user equipment (UE), the indication including duration information signaling whether the UE is configured to receive a public warning system (PWS) signal within a duration, wherein the indication further includes a request for a discontinuous reception (DRX) cycle value associated with the PWS signal from the network device,
determine whether the UE is configured to receive the PWS signal within the duration based on the indication,
configure the DRX cycle value for the PWS signal based on the determination and the request included in the indication,
send, via the transceiver, the configured DRX cycle value to the UE,
configure the UE to update, for a paging signal corresponding to the PWS signal, the configured DRX cycle value with a historic configured DRX cycle value when the UE is located in a region at risk of prompting a transmission of the PWS signal, and
send, via the transceiver, to the UE the paging signal corresponding to the PWS signal based on the configured DRX cycle value.

19. The network device of claim 18, wherein the at least one processor is further configured to determine whether the UE is capable of receiving the PWS signal based on the indication, wherein if the UE is at least one of capable of receiving the PWS signal or configured to receive the PWS signal within the duration:
the configured DRX cycle value is a first DRX cycle value; and
the sending of the configured DRX cycle value indicates to the UE that the UE is allowed to receive the paging signal based on a minimum one of the first DRX cycle value, a default DRX cycle value, or a radio access network (RAN) configured DRX cycle value.

20. The network device of claim 19, wherein if the UE is not capable of receiving the PWS signal or is not configured to receive the PWS signal within the duration:
the configured DRX cycle value is a second DRX cycle value; and
the sending of the configured DRX cycle value indicates to the UE that the UE:
is to receive the paging signal based on the second DRX cycle value.

21. The network device of claim 19, wherein:
the indication further indicates information regarding PWS-capability or non-PWS-capability.

22. The network device of claim 21, wherein:
the indication is received via a non-access stratum (NAS) registration procedure or a capability update procedure.

23. The network device of claim 19, wherein:
the at least one processor configured to determine whether the UE is capable of receiving the PWS signal is further configured to determine that the UE monitors paging according to an established paging duration; and
the at least one processor configured to send the paging signal is further configured to send the paging signal to the UE for a paging duration at least as long as the established paging duration.

24. The network device of claim 18, wherein the paging signal includes a sequence number or index of the PWS signal corresponding to the paging signal.

25. A method of wireless communication at a user equipment (UE), comprising:
sending an indication, to a network device, that includes duration information signaling whether the UE is configured to receive a public warning system (PWS) signal within a duration, wherein the indication further includes a request for a discontinuous reception (DRX) cycle value associated with the PWS signal from the network device;
receiving, from the network device, a configured DRX cycle value associated with the PWS signal based on the request included in the indication; and
receiving, from the network device, a paging signal corresponding to the PWS signal associated with the configured DRX cycle value, wherein the reception of the paging signal comprises:
determining whether the UE is located in a region at risk of prompting a transmission of the PWS signal, wherein the reception of the paging signal is based on a minimum one of the configured DRX cycle value, a default DRX cycle value, or a radio access network (RAN) configured DRX cycle value when the UE is determined to be located in the region, the reception being further based on at least one of when the UE is capable of receiving the PWS signal or when the duration information signals that the UE is configured to receive the PWS signal within the duration.

26. A user equipment (UE) for wireless communication, comprising:
a transceiver;
a memory comprising instructions; and
at least one processor configured to execute the instructions and cause the UE to:
send, via the transceiver, an indication to a network device, the indication including duration information signaling whether the UE is configured to receive a public warning system (PWS) signal within a duration, wherein the indication further includes a request for a discontinuous reception (DRX) cycle value associated with the PWS signal from the network device,
receive, via the transceiver, from the network device a configured DRX cycle value associated with the PWS signal based on the request included in the indication, and
receive, via the transceiver, from the network device a paging signal corresponding to the PWS signal associated with the configured DRX cycle value, wherein the at least one processor configured to receive the paging signal is further configured to:
determine whether the UE is located in a region at risk of prompting a transmission of the PWS signal, wherein the reception of the paging signal is based on a minimum one of the configured DRX cycle value, a default DRX cycle value, or a radio access network (RAN) configured DRX cycle value when the UE is determined to be located in the region, the reception being further based on at least one of when the UE is capable of receiving the PWS signal or when the duration information signals that the UE is configured to receive the PWS signal within the duration.

* * * * *